United States Patent
Schlipf

(10) Patent No.: US 11,696,530 B2
(45) Date of Patent: Jul. 11, 2023

(54) HEADER HEIGHT CONTROL SYSTEM ACCOUNTING FOR CHANGE IN HEADER PITCH

(71) Applicant: Headsight, Inc., Bremen, IN (US)

(72) Inventor: Robert Schlipf, Nappanee, IL (US)

(73) Assignee: Precision Planting LLC, Duluth, GA (US)

( * ) Notice: Subject to any disclaimer, the term of this patent is extended or adjusted under 35 U.S.C. 154(b) by 830 days.

(21) Appl. No.: 16/486,071

(22) PCT Filed: Feb. 14, 2018

(86) PCT No.: PCT/US2018/018263
§ 371 (c)(1),
(2) Date: Aug. 14, 2019

(87) PCT Pub. No.: WO2018/152266
PCT Pub. Date: Aug. 23, 2018

(65) Prior Publication Data
US 2020/0000034 A1    Jan. 2, 2020

Related U.S. Application Data

(60) Provisional application No. 62/458,896, filed on Feb. 14, 2017.

(51) Int. Cl.
*A01D 41/14* (2006.01)
*A01D 41/127* (2006.01)

(52) U.S. Cl.
CPC ......... *A01D 41/141* (2013.01); *A01D 41/127* (2013.01)

(58) Field of Classification Search
CPC .... A01D 34/28; A01D 34/283; A01D 34/286; A01D 41/127; A01D 41/141; A01D 41/145; A01D 91/00; A01D 91/02
See application file for complete search history.

(56) References Cited

U.S. PATENT DOCUMENTS

| | | | |
|---|---|---|---|
| 6,826,894 B2 * | 12/2004 | Thiemann | A01D 41/141 |
| | | | 701/50 |
| 7,310,931 B2 * | 12/2007 | Gramm | A01D 41/14 |
| | | | 56/208 |

(Continued)

FOREIGN PATENT DOCUMENTS

| | | |
|---|---|---|
| WO | 2012142555 A1 | 10/2012 |
| WO | 2014127043 A1 | 8/2014 |

OTHER PUBLICATIONS

International Search Report and Written Opinion, PCT Application No. PCT/US2018/018263, dated Apr. 30, 2018, 11 pages.

(Continued)

*Primary Examiner* — Adam J Behrens
(74) *Attorney, Agent, or Firm* — Thomas J. Oppold; Larkin Hoffman Daly & Lindgren, Ltd.

(57) ABSTRACT

A method of height control of a machine attachment during operation at different fore-and-aft pitch angles. A height controller receives a first signal magnitude generated by a height sensor disposed on the machine attachment. The first signal magnitude is relative to a first height of the machine attachment disposed at a first pitch angle. The angular degree change is determined when the machine attachment is moved from the first pitch angle to a second pitch angle. A corrected signal magnitude is determined by applying a correction factor to the first signal magnitude. The correction factor is a product of said angular degree change and a scale factor.

38 Claims, 15 Drawing Sheets

(56) References Cited

U.S. PATENT DOCUMENTS

| | | | | |
|---|---|---|---|---|
| 7,647,753 | B2* | 1/2010 | Schlipf | A01D 41/141 |
| | | | | 56/10.2 E |
| 8,333,057 | B2* | 12/2012 | Schroeder | A01D 41/141 |
| | | | | 56/10.2 E |
| 8,881,495 | B2 | 11/2014 | Lohrentz et al. | |
| 9,980,431 | B2* | 5/2018 | Long | A01D 75/287 |
| 10,244,680 | B2* | 4/2019 | Schlipf | A01D 41/141 |
| 10,531,607 | B2* | 1/2020 | Schroeder | A01D 41/141 |
| 10,694,654 | B2* | 6/2020 | Walker | A01D 63/04 |
| 2008/0155954 | A1* | 7/2008 | Schlipf | A01D 41/141 |
| | | | | 56/10.2 E |
| 2010/0299031 | A1 | 11/2010 | Zhdanov et al. | |
| 2013/0116894 | A1 | 5/2013 | Perez-Iturbe et al. | |
| 2014/0041352 | A1 | 2/2014 | Johnson | |
| 2015/0271999 | A1* | 10/2015 | Enns | A01D 41/145 |
| | | | | 700/275 |
| 2016/0007531 | A1* | 1/2016 | Schlipf | A01D 41/14 |
| | | | | 56/10.2 E |
| 2016/0270290 | A1* | 9/2016 | Johnson | A01D 75/287 |
| 2018/0098491 | A1* | 4/2018 | Long | A01D 41/127 |

OTHER PUBLICATIONS

"Extended European Search Report", received from European Patent Office, Application No. 18754074.5, dated Nov. 25, 2020, 5 pages.

* cited by examiner (Set Point A)

(Set Point B)

(Set Point C)

(Set Point B)

(Sensor Rearward of Cutterbar)

(Sensor Forward of Cutterbar)

(Sensor Forward and Rearward of Cutterbar)

(Header Pitched Aft Sensor Forward of Cutterbar)

HEADER HEIGHT CONTROL SYSTEM ACCOUNTING FOR CHANGE IN HEADER PITCH

BACKGROUND

Modern combine harvester headers, whether for corn, small grain or other crops, can exceed 40 feet in width and can cost in excess of $150,000. When in use, these massive headers are mounted to combine harvesters weighing in excess of 30 tons, traveling at speeds between five to ten miles per hour during harvesting operations. Due to the size of these headers and the potential damage and downtime that can result if the header is inadvertently run into the ground, it has become essential to use header height sensors and automatic header control systems to ensure that the header remains at the desired height above the ground as the field topography changes. Header height sensors and proper calibration of the header control system are even more critical in challenging harvest conditions, such as when it is necessary to run the header close to the ground to harvest "down crop." U.S. Pat. No. 7,647,753 issued to Headsight, Inc. and International Patent Publication No. WO2014/127043, are directed to improving the responsiveness of automatic header height control systems.

In addition to controlling header height relative to the ground surface across the width of the header, including controlling lateral tilt (i.e., side-to-side tilt) of the header, modern combines also provide header pitch control (i.e., fore and aft tilt) of the header. Changing the pitch angle of the header depending on crop conditions can improve header performance with respect to crop feeding and material flow, the ability to pick up down crop, stalk chopping performance, stubble management, etc. U.S. Pat. Nos. 8,881,495 and 6,826,894 describe headers with pitch angle control and the use of sensors for detecting and controlling the pitch angle.

Though there are a variety of sensors that may be employed for sensing header height, including contact sensors (e.g., mechanical arms with rotation sensors) and non-contact sensors (e.g., sonar, radar, etc.), it should be appreciated that the output signals generated by such sensors, which correlate to distance measurements, are dependent upon the header geometry, the sensor mounting locations on the header, and the pitch angle of the header. For example, on a grain head positioned with the cutter bar at a known height above the ground, changing the pitch of the header will cause a corresponding change in the height of the height sensor with respect to the cutter bar, thereby resulting in different output signals of the height sensor. For example, if a height sensor is mounted in front of the cutter bar and the nose of the header is pitched downwardly from horizontal, the distance to the ground reported by that sensor will decrease. Conversely, if the nose of the header is pitched upwardly from horizontal, the distance reported by the sensor will increase. Accordingly, it should be appreciated that automatic header control systems are dependent upon an accurate ground distance reading and calibrated reference value to provide accurate and effective header position control. In order to provide such accurate and effective header position control, the pitch angle of the header should be taken into account.

Therefore, there is a need for a header height control system that will correctly detect the distance to the ground throughout the pitch angle range of the header by taking into account changes in the height sensor distance readings that may occur due to changes in the header pitch.

DESCRIPTION

Figure 1:
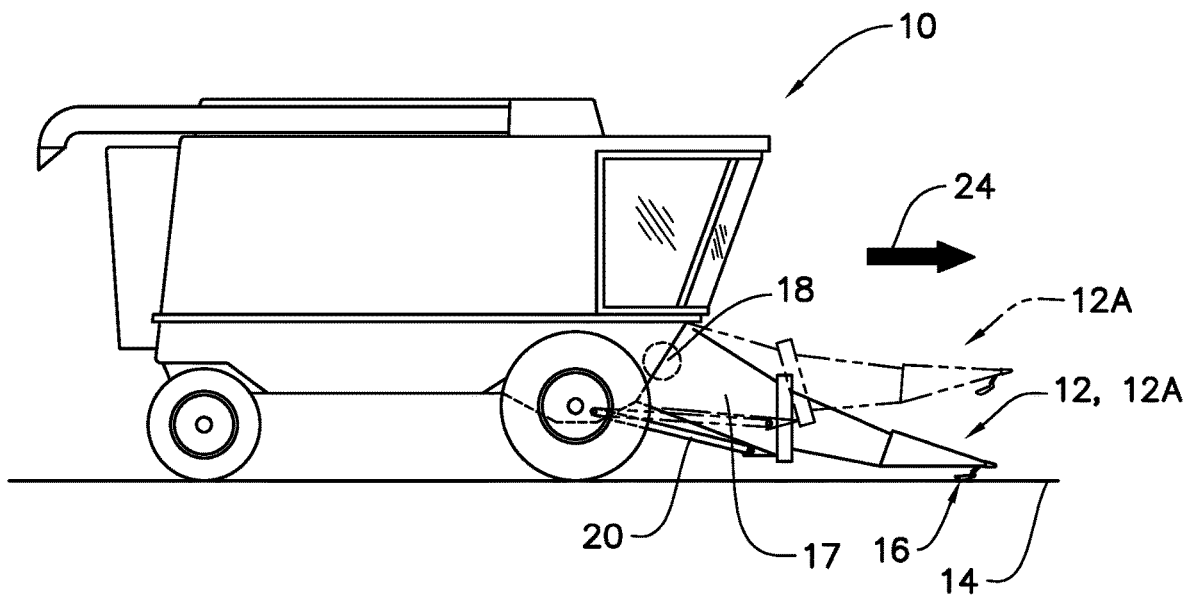
FIG. 1 illustrates a conventional combine with a corn header mounted thereon and showing a height sensor in the form of a height sensing arm mounted near a tip of one of the crop dividers.
Figure 2:
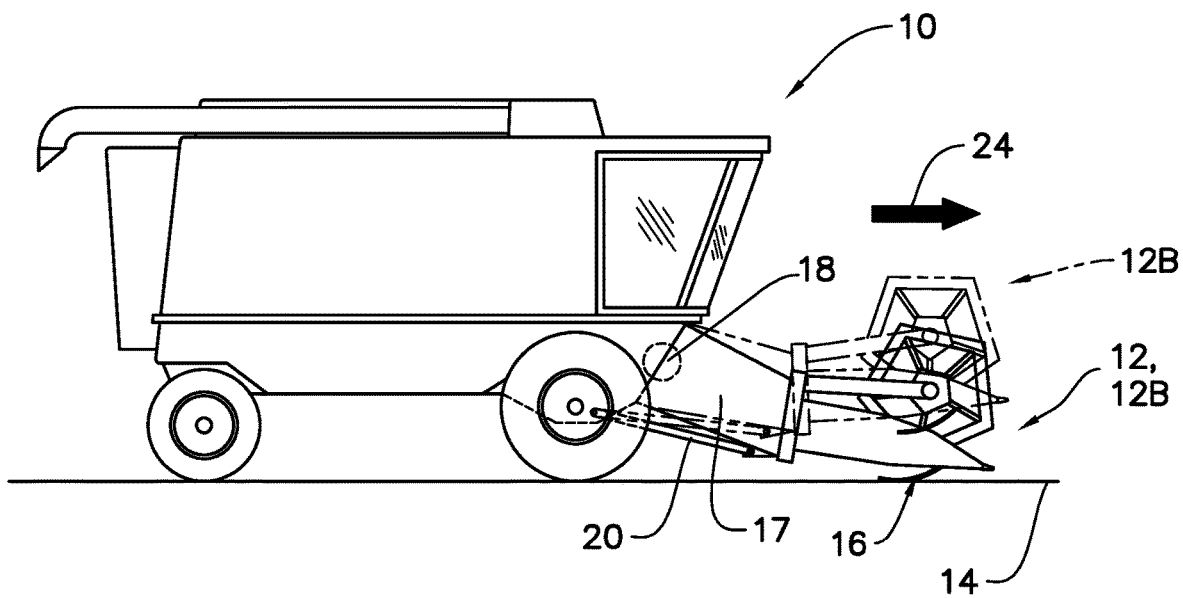
FIG. 2 illustrates a conventional combine with a grain header mounted thereon and showing a height sensor in the form of a height sensing arm mounted near the forward end of the grain head.

Referring now to the drawings, wherein like reference numerals designate identical or corresponding parts throughout the several views, FIGS. 1 and 2 illustrate a machine, such as an agricultural combine harvester, indicated generally by reference numeral 10 having an attachment 12, such as a "header", mounted thereon. A control system 100 (FIG. 10) is responsive to signal outputs from a plurality of height sensors 16 mounted to the attachment 12 to effect raising and lowering of the attachment 12 with respect to a surface 14. The signal outputs from the height sensors 16 are variable in magnitude with respect to changes in height of the attachment 12 relative to the surface 14.

While this description and the drawing figures reference and depict an agricultural combine harvester and height sensors used to effect raising and lowering of the header attachment, it should be understood that the term "machine" should be understood to include any type of agricultural, industrial, or other machine. Additionally, for purposes of this description the term "header" should be understood to include any type of attachment, whether permanently affixed to or integral with the machine or whether removable from the machine where such attachment is raised or lowered with respect to a surface. Also, for purposes of this description, the term "height sensor" should be understood to include any type of contact sensor or non-contact sensor that is capable of generating output signals variable in magnitude with respect to elevation changes of the attachment relative to a surface. For example, contact sensors may include, but are not limited to, ground contacting pivoting arms coupled to rotational or position sensors for detecting the angular or linear position of the arm. Non-contact sensors may include, but are not limited to, ultrasonic, laser or radar sensors. Furthermore, as used herein, the term "signal output" should be understood as meaning or including any signal value or signal characteristic generated by a height sensor that may be used for indicating height relative to a surface, including voltage, current, pulse width, etc.

In FIG. 1 the machine 10 is shown as an agricultural combine harvester and the attachment 12 is shown as a corn header 12A with the height sensors 16 attached at or near the forward most tips of the header 12A. In FIG. 2, the machine 10 is shown as an agricultural combine harvester and the attachment 12 is shown as a grain header 12B with the height sensors 16 attached rearward of the cutterbar. The headers 12A, 12B are mounted in a conventional manner to the forward end of the feederhouse 17 of the combine 10. As is conventional, the rearward end of the feederhouse 17 is pivotally connected to the main body of the combine 10 as represented by pivot point 18. As is also conventional, hydraulic cylinders 20 are pivotally connected at one end to the main body of the combine 10 and at their other end to the forward end of the feederhouse 17. Thus, it should be appreciated that by actuating the cylinders 20 using the header control system 100, the feederhouse 17 and the header 12A, 12B mounted thereto may be raised and lowered substantially vertically, but in a broad arc about the pivot point 18. Additionally, in combines equipped with a lateral tilt feature, the header 12A, 12B may be tilted from side-to-side about the longitudinal centerline of the feederhouse 17 by actuating the feederhouse lateral tilt cylinders (not shown).

Figure 3:
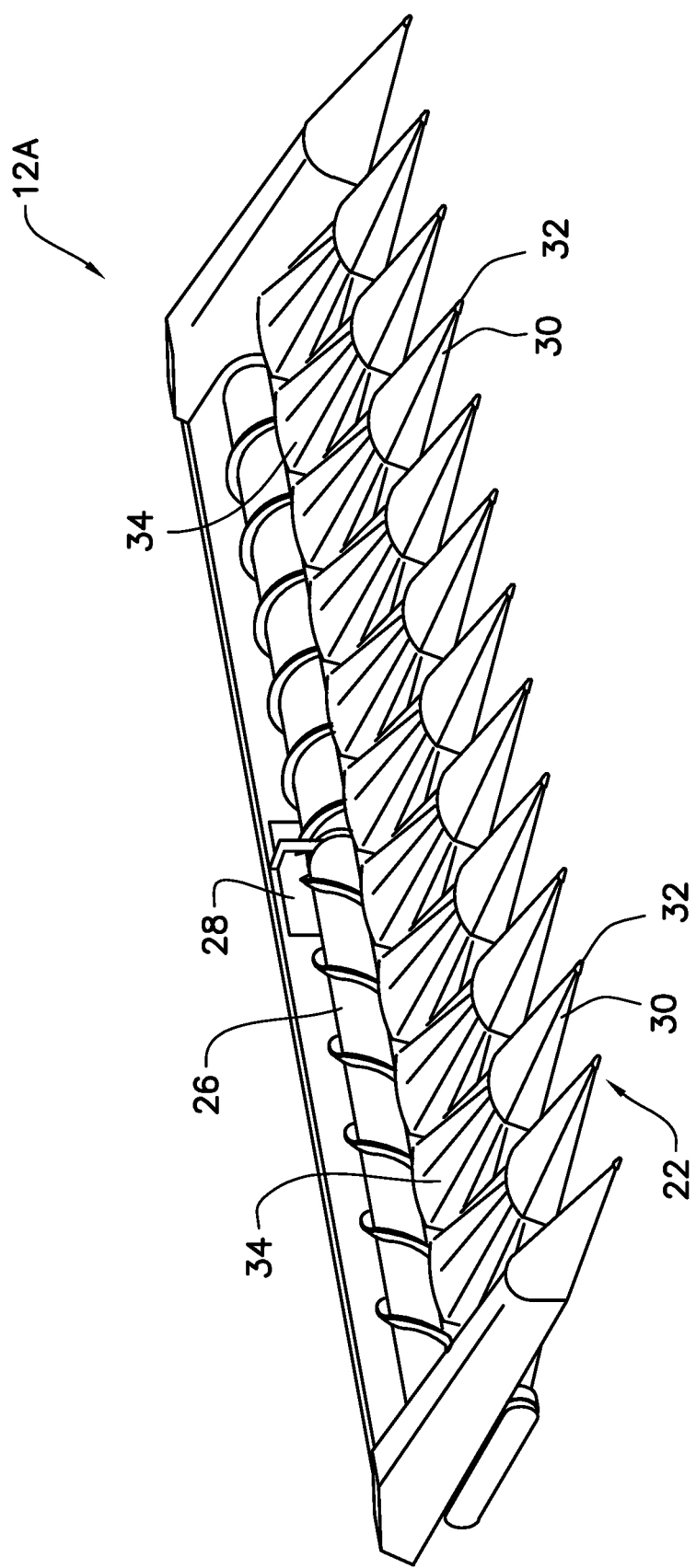
FIG. 3 is a perspective view of a typical corn header.

FIG. 3 is a perspective view of a typical corn header 12A. The header 12A includes a plurality of crop dividers 22. The header 12A is shown as a twelve-row header, in that there are twelve spaces between the rearwardly converging crop dividers 22 into which the rows of the corn to be harvested are gathered. Header widths may vary and typically range from four rows up to twenty four rows.

Referring to FIGS. 1 and 3, in operation when harvesting corn, as the combine is driven forwardly as indicated by arrow 24 in FIG. 1, the corn stalks will be gathered between the rearwardly converging crop dividers 22. As the combine proceeds forwardly, the ears are stripped from the stalks and the loose ears, husks and other gathered crop debris are augured toward the central area of the header 12A by the rotating transverse auger 26. The harvested ears of corn then pass through the central opening 28 in the back of the header 12A and are then conveyed by the feeder house 17 into the interior of the combine. Within the body of the combine, the ears of corn are husked and shelled. The husks, the shelled cobs, and other unwanted crop debris are discharged out the rear of the combine while the shelled corn kernels are augured into a temporary holding tank until being unloaded.

Figure 4:
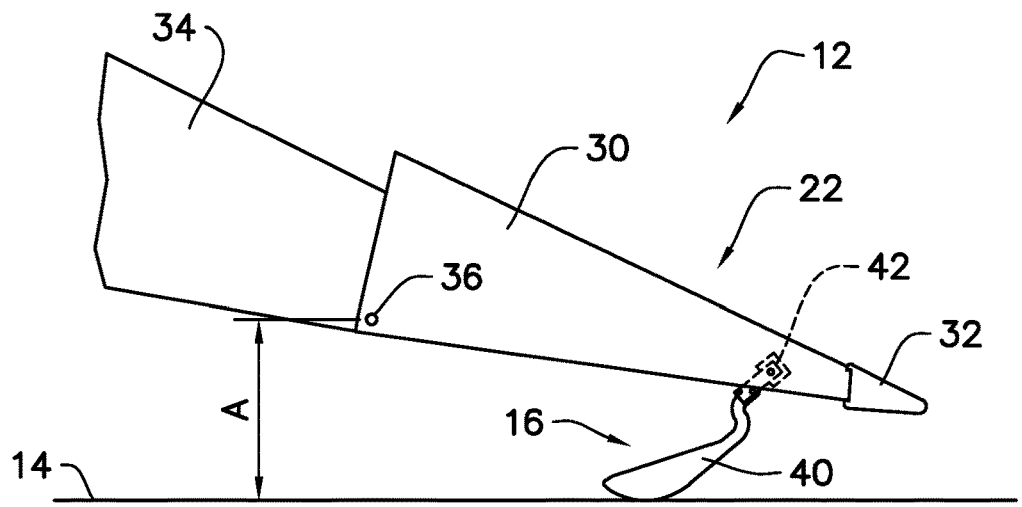
FIG. 4 is a side elevation view of the corn header of FIGS. 1 and 3 shown at Set Point A.

Referring to FIGS. 3 and 4, each crop divider 22 comprises a semi-conical forward portion or snout 30 and a semi-cylindrical rearward portion 34. Each snout 30 typically includes a hardened or impact resistant point or tip 32. The snout 30 is pivotally mounted by bolts or pins 36 (FIG.

Figure 5:
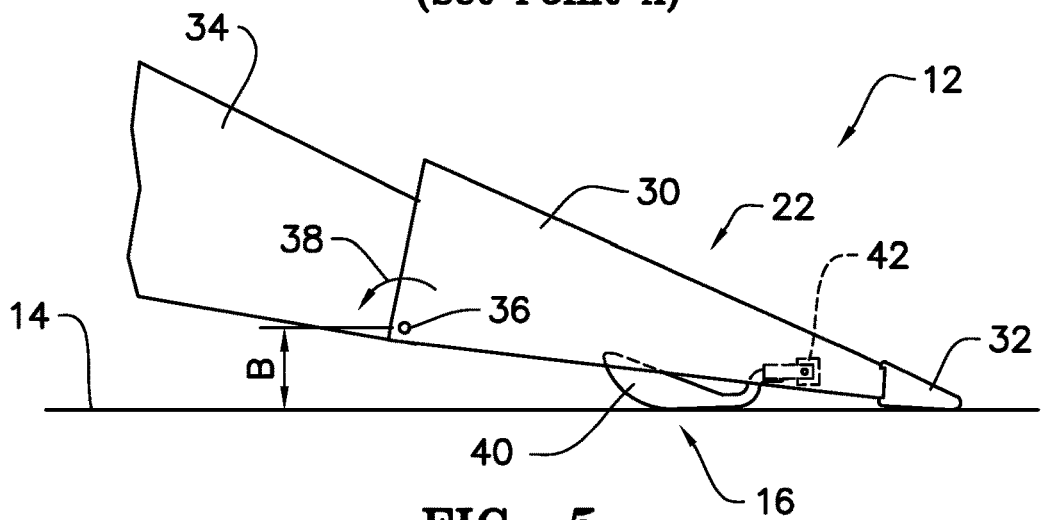
FIG. 5 is a side elevation view of the corn header of FIG. 4 illustrating further pivoting movement of the height sensing arm as the header is further lowered toward the ground to Set Point B.
Figure 6:
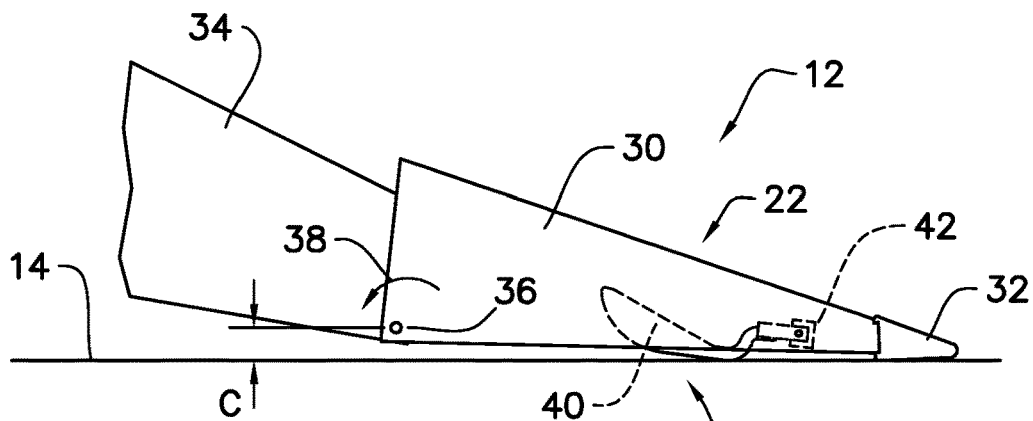
FIG. 6 is a side elevation view of the corn header of FIG. 5 illustrating further pivoting movement of the height sensing arm as the header is further lowered toward the ground to Set Point C and illustrating the pivoting movement of the crop-divider after its tip contacts the ground.

4) to the semi-cylindrical rearward portion 34 which is releasably secured in position so as to be rotationally fixed relative to the header frame. FIGS. 4-6 illustrate the ability of the snouts 30 to pivot with respect to the fixed rearward portions 34 about the pin 36 as indicated by arrow 38 when the snout tip 32 contacts the ground surface 14. The angle of the snouts 30 with respect to the fixed rearward portion 34 are adjustable by any conventional means, such as by a chain linkage or other adjustable mechanism, so the snouts 30 may be set at a desired angle relative to the fixed rearward portions 34.

As best illustrated in FIGS. 4-6, disposed below the header 12A and preferably mounted near the tip 32 of the snouts 30 is a height sensor 16. The header 12A will typically include multiple height sensors 16 evenly spaced across the width of the header. For example, it is typically desirable to have a height sensor mounted to the outermost crop dividers 22 with one height sensor mounted on the middle crop divider or two or more height sensors evenly spaced between the outermost crop dividers 22 depending on the width of the header. The height sensors 16 cooperate with the header height control system 100 to effect header height changes as described later. In addition, if the combine is so equipped, the height sensor in combination with the height control system may also affect lateral tilt of the header if the ground elevation is higher on one side versus the other.

In the embodiment illustrated in FIGS. 4-6, 13, and 15-16 the height sensor 16 is shown as a spring-biased arm 40 to which is coupled a rotational sensor 42 at a forward end thereof. The rotational sensor 42 may be a potentiometer or any other electronic or magnetic height sensor capable of generating an output signal in response to the angular position of the arm 40. The output signals of the height sensors 16 vary in magnitude in relation to the rotational position of the arm 40 with respect to the header, thereby establishing a generally proportional relationship between the height of the header 12A above the ground surface. One suitable spring-biased arm with rotational sensor is disclosed in U.S. Pat. No. 6,202,395 to Gramm, the commercial embodiment of which is distributed by Headsight, Inc., 4845 3B Road, Bremen, Ind. 46506.

FIGS. 4-6 illustrate the vertical movement of the pivoting element of the header 12A (i.e., the snouts) and the rotation of the height sensor 16 as the header is lowered between "Set Point A", "Set Point B" and "Set Point C" corresponding to the heights "A", "B" and "C" of the pivot point 36 of the header above the ground surface. Set Point A, may be any point or height where the snout tips (i.e, the pivoting element of the header) is not yet in contact with the ground surface. However, for purposes of this description, Set Point A, as shown in FIG. 4, is assumed to correspond to the height "A" of the pivot point 36 nearest the ground but where the arm and rotational sensor have not yet begun to rotate so that the output signal of the rotational sensor is at its maximum. FIG. 5 illustrates an example of Set Point B, which corresponds to the height "B" of the pivot point 36 above the ground surface when the snout tip 32 makes first contact with a ground surface 14 (i.e., where the pivoting element begins to pivot). FIG. 6 illustrates an example of Set Point C which corresponds to the height "C" of the pivot point 36 above the ground surface when the header is at its lowest point (e.g., when the skids of the corn header are on the ground).

In other embodiments it should be appreciated that Set Point A may be any elevation above Set Point C, particularly if non-contact sensors are employed for detecting the height or position above a surface to define the upper range at which the header is expected to operate.

Figure 7A:
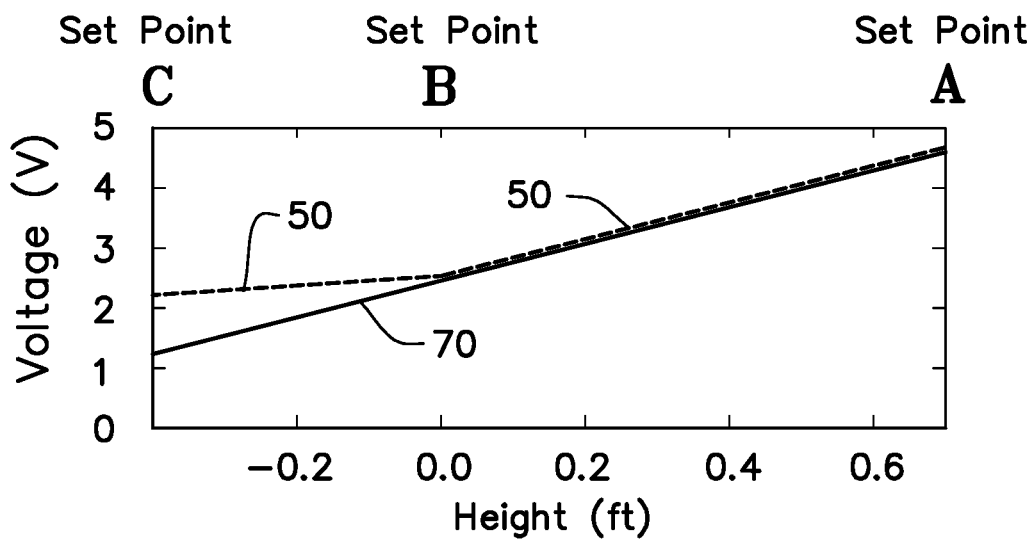
FIG. 7A is a diagram representing the change in height sensor output signal (in volts) with respect to height as the header is lowered from Set Point A to Set Point C. The solid line represents the modified output signal between Set Points A, B and C (i.e., "gain" applied) versus the unmodified output signal (dashed line).
Figure 7B:
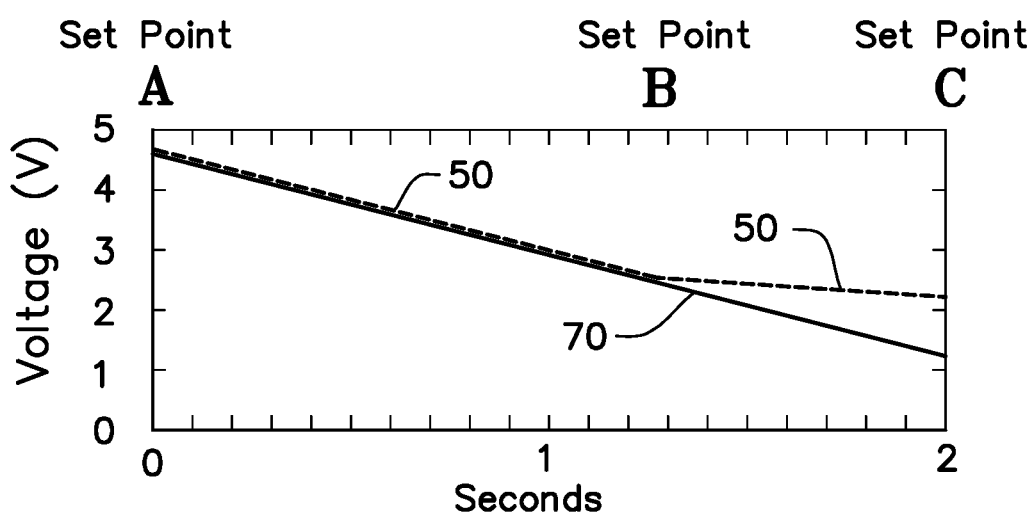
FIG. 7B is a diagram representing the change in height sensor output signal (in volts) with respect to time as the header is lowered from Set Point A to Set Point C. The solid line represents the modified output signal between Set Points A, B and C (i.e., "gain" applied) versus the unmodified output signal (dashed line).

FIGS. 7A and 7B, are illustrations of a plot of a representative sample of the output signal of the height sensor 16 (represented in volts, for purposes of this example) in relation to vertical movement of the header as it moves between Set Point A, Set Point B and Set Point C. In FIG. 7A, the output signals are plotted in relation to the actual height of the header above the ground, whereas in FIG. 7B, the output signals are plotted in relation to time as the header is lowered at a constant rate between Set Points A and C. It should be appreciated that the plotted curve and/or linearity and slope of the output signal of the height sensor will vary depending on the shape of the height sensing arm and/or the type of height sensor used and its position on the header.

Continuing to refer to FIGS. 7A and 7B, the output signal of the height sensor 16 in relation to the vertical height of the header 12A is substantially linearly proportional to the height of the header until the snout tip 32 makes contact with the ground surface 14 (i.e., Set Point B as illustrated in FIG. 5). This is due to the fact that, as previously discussed, the snout 30 (to which the height sensor 16 is attached), is pivotable with respect to the rear portion 34 of the crop divider 22 about pin 36. Accordingly, once the snout tip 32 contacts the ground, as the header 12A continues to be lowered, the snout 30 will begin to pivot about pin 36 as indicated by arrow 38 in FIG. 5 as the rear portion 34 of the crop divider 22 continues to move downwardly with the rest of the header 12A. As a result, it should be appreciated that the actual header height will no longer have the same substantially linear proportionality to the rotational movement of the arm 40 because the rotation of the arm 40 will change very little relative to the snout once the snout tip touches the ground. The same change in linearity of the output signal magnitude would occur as well with other types of height sensors, such as non-contact sensors.

Continuing to refer to FIGS. 7A and 7B, the scale range of the magnitude of the output signal of the height sensor 16 is shown as being between 0 to 5 volts because most conventional combine header control systems accept voltage inputs between 0.5 volts and 4.5 volts. Accordingly, for purposes of this description, the output voltage at Set Point A of the height sensor 16 is preferably about 4.4 volts, which is within the 4.5 maximum voltage range accepted by most combine header control systems, while also allowing a slight margin for error. It should be appreciated that any particular magnitude of signal ranges may be used. As indicated by dashed line 50, the plotted voltage output to header height between Set Points A and B is substantially linear. However, as the header continues to move downwardly beyond Set Point B, the slope of the dashed line 50 changes significantly because the actual header height no longer has the same substantially linear proportionality to the rotational movement of the arm 40 because the rotation of the arm 40 changes very little relative to the snout due to the snout pivoting.

Figure 8:
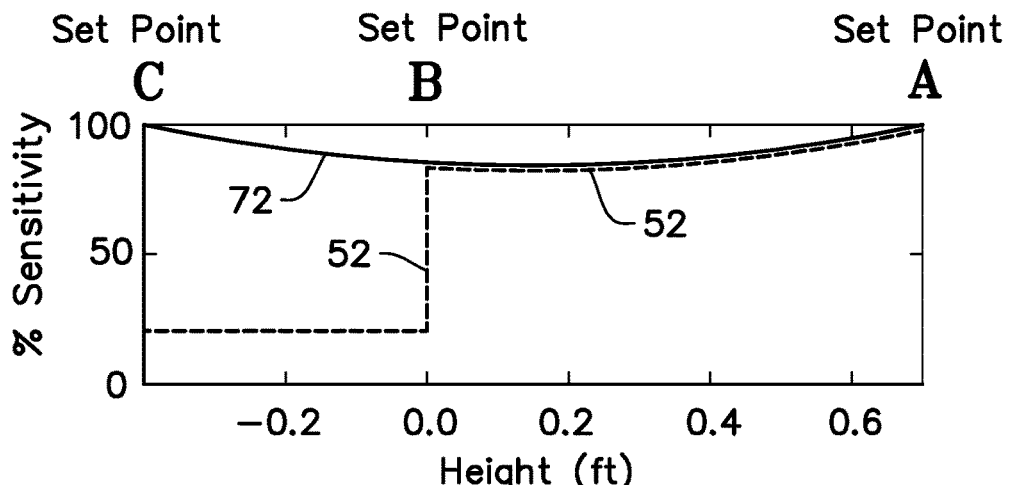
FIG. 8 is a diagram representing the change in sensitivity as a percentage of the overall sensitivity of the height sensor as the header is lowered from Set Point A to Set Point C. The solid line represents the modified sensitivity between Set Points A, B and C versus the unmodified sensitivity (dashed line).

The diagram of FIG. 8 represents a plot of the sensitivity of the sensor versus the change in height between Set Points A, B and C. Again, it should be appreciated that the plotted curve and/or linearity and slope will vary depending on the shape of the height sensing arm and/or the type of height sensor used and its position on the header. As illustrated, the plot of the sensitivity of the height sensor versus the change in height between Set Points A, B and C, as represented by dashed line 52 remains substantially constant between Set Points A and B, but beyond Set Point B, the sensitivity drops dramatically (to as low as 20% of the maximum) due to the pivoting of the snout.

Figure 9A:
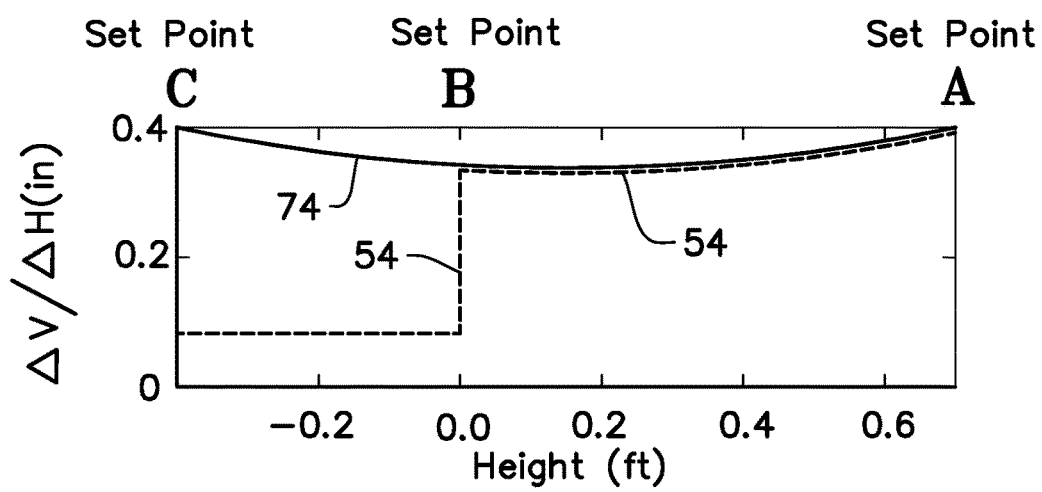
FIG. 9A is another diagram representing the change in the height sensor output signal (in volts) per change in height ($\Delta V/\Delta H$) as the header is lowered from Set Point A to Set Point C. The solid line represents the modified $\Delta V/\Delta H$ between Set Points A, B and C versus the unmodified $\Delta V/\Delta H$ (dashed line).
Figure 9B:
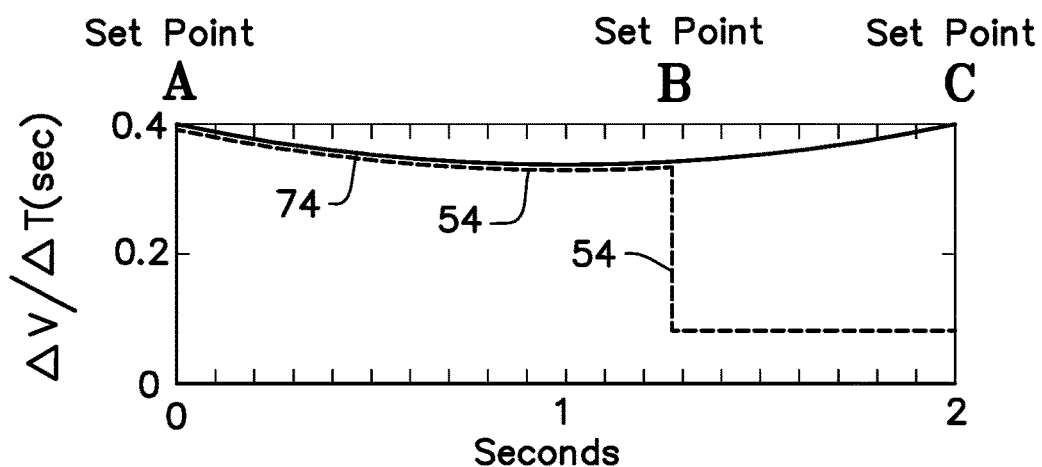
FIG. 9B is another diagram representing the change in the height sensor output signal (in volts) per change in time ($\Delta V/\Delta T$) as the header is lowered from Set Point A to Set Point C. The solid line represents the modified $\Delta V/\Delta T$ between Set Points A, B and C versus the unmodified $\Delta V/\Delta T$ (dashed line).

FIG. 9A is a representative plot of the sensor sensitivity with a vertical scale ranging from 0 to 0.4 ΔV/ΔH (i.e., signal output per height) as the header height moves between Set Points A, B and C. FIG. 9B is a representative plot of the sensor sensitivity with a vertical scale ranging from 0 to 0.4 ΔV/ΔT (i.e., signal output per time) as the header height moves between Set Points A, B and C. Again, it should be appreciated that the plotted curve and/or linearity and slope will vary depending on the shape of the height sensing arm and/or the type of height sensor 16 used and its position on the header. As illustrated, the sensitivity of the height sensor 16, as represented by dashed line 54, remains substantially constant between Set Points A and B, but below Set Point B, the sensitivity drops dramatically due to the pivoting of the snout.

Figure 10:
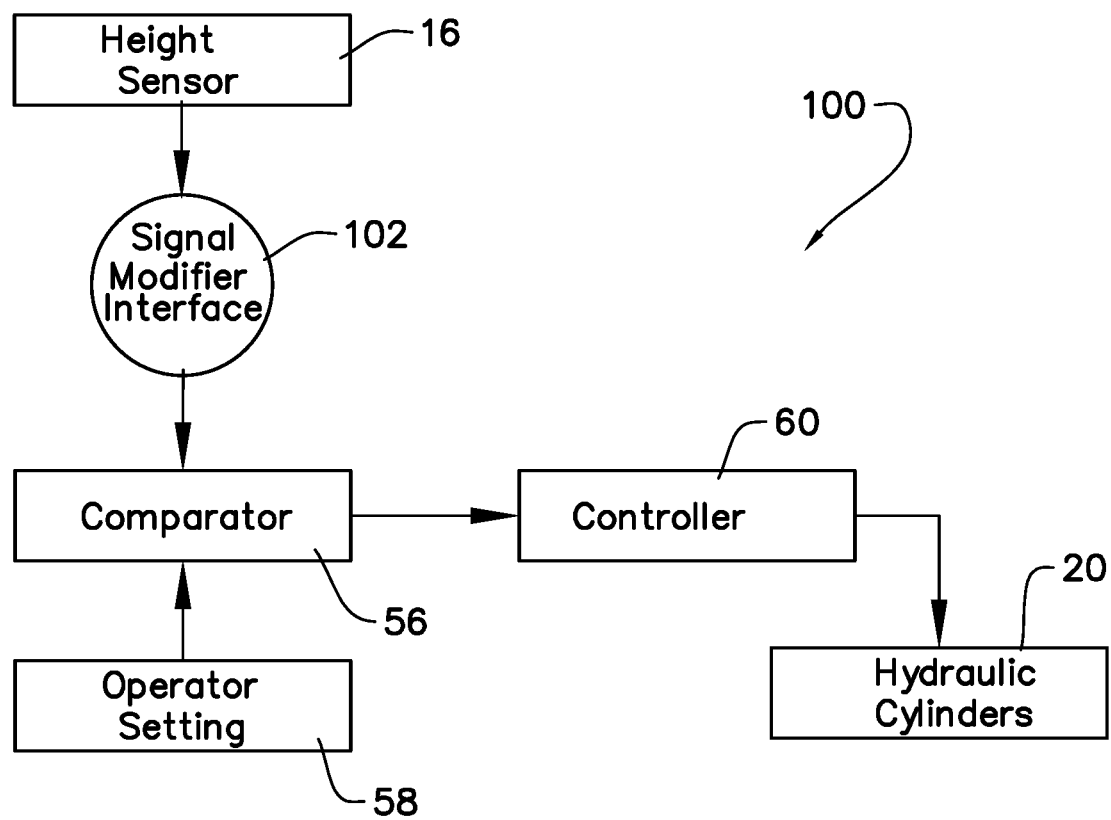
FIG. 10 is a functional block diagram for one embodiment of a control system for raising and lowering a header utilizing a modified signal.

FIG. 10 illustrates an embodiment of a header control system 100. As previously described, the height sensor 16 generates an output signal variable in magnitude with respect to the height of the header relative to the ground, which, in the embodiment shown in FIGS. 4-6, is the rotational position of the arm 40. The output signal is fed to a comparator 56 which also is capable of receiving a signal from the operator setting control 58 establishing the operator's desired operating height for the header (hereinafter the "Set Height") typically set by manipulation of a lever or rotary control in the cab of the combine. The comparator 56 will generate an output signal (hereinafter the "Comparator Output") representative of (e.g., proportional to) the difference between the height of the header relative to the ground as sensed by the height sensor 16 (hereinafter the "Sensed Height") and the Set Height. The Comparator Output is fed to a controller 60 which operably actuates the hydraulic cylinders 20 to raise and lower the header 12A. It should be understood that the controller 60 may be a proportional hydraulic control typical of most late model combines, or the controller may be a non-proportional hydraulic control found on older model combines. The comparator 56 may also be incorporated into or form a part of the controller 60 and/or may otherwise be adapted to communicate with the controller 60.

If the Sensed Height is the same as the Set Height (or within the preset "dead band" (discussed below)), the Comparator Output will not cause the controller 60 to actuate the hydraulic cylinders 20. If the terrain inclines, causing the Sensed Height to be below the Set Height, the Comparator Output will cause the controller to actuate the hydraulic cylinders 20 to raise the header 12A until the Sensed Height equals the Set Height. Conversely, if the terrain declines causing the Sensed Height to be above the Set Height, the Comparator Output will cause the controller 60 to actuate the hydraulic cylinders 20 to lower the header 12A until the Sensed Height equals the Set Height. To prevent excessive oscillation of the controller 60 and hydraulic cylinders 20, the controllers are generally programmed or programmable with a "dead band" whereby the Comparator Output indicating only slight differences in the Sensed Height on either side of the Set Height will be ignored by the controller 60 (i.e., the controller 60 will not actuate the hydraulic cylinders 20).

It should also be appreciated that because the effective sensitivity of the height sensor 16 is decreased below Set Point B (due to the reduced relative movement of the sensor in relation to the snout), as represented by dashed lines 52 and 54 in FIGS. 8 and 9 respectively, the dead band will undesirably effectively increase at this most critical height. For example, assume the operator sets the Set Height such that the snout tip is at ground level and the controller 60 is programmed or set to have a dead band of one inch on either side of the Set Height. Under these conditions, if the terrain suddenly increases by three inches, for example, due to the poor sensitivity of the height sensor 16 at this height, the sensor may not detect the change in terrain to cause the comparator 56 to generate a Comparator Output signal. Furthermore, due to the decreased effective sensitivity of the height sensor 16 at this height, the Comparator Output typically will not accurately represent the true height of the header above the ground surface. Additionally, if this inaccurate Comparator Output is still within the dead band range, the controller 60 will not actuate the hydraulic cylinders 20. Thus, under such circumstances, the header could potentially impact the ground before the controller 60 actuates the hydraulic cylinders 20 to raise the header.

Accordingly, it is desirable to improve the effective sensitivity of the height sensor near and below Set Point B so as to improve the responsiveness of the header height control system when the snouts 30 are being run at or near ground level. To accomplish the desired improved responsiveness, the magnitude of the signal indicating the header height is modified by applying a "gain" factor or multiplier to the signal when the height of the header is detected as being at or below Set Point B. As represented in FIG. 10, the output signal of the height sensor is modified by a signal modifier interface 102 which modifies the output signal from the height sensors 16 before the output signal reaches the comparator 56. One suitable signal modifier interface 102 is a programmable digital microcontroller interface, such as the Insight® control box available from Headsight, Inc., 4845 3B Road, Bremen, Ind. 46506 or the Horizon® controller also available from Headsight, Inc.

The interface 102 may be disposed at the rear of the harvesting header in such a location that it may be connected to the existing electronic connections on the combine's feeder house 17. It should be appreciated, however, that modification of the signal may take place at any point in the header control system 100 between the height sensor 16 and the output of the controller 60. For example, the output of the comparator 56 and/or controller 60 may be modified by programming the controller 60 to modify the signal to apply the appropriate gain value (discussed below) and/or by calibrating the controller 60 to effectively apply the desired gain value(s) to the controller output signal. Thus, it should also be appreciated that the interface 102 or functionality of the interface 102 may be incorporated into or form a part of the controller 60. Alternatively, the modification of the signal could take place at or within the height sensor itself if the sensor is capable of being programmed to apply a gain or multiplier before outputting the signal.

One method of modifying the signal to account for the loss of effective sensitivity of the sensor below Set Point B, is to determine the magnitude of the signal when the header is at Set Point B (hereinafter referred to as the "Set Point B Magnitude" (SPBM). With the SPBM known, for any signals generated by the rotational sensor that have a magnitude greater than the SPBM, it is known that the header is positioned above Set Point B. It follows, then, that if the generated signal of the rotational sensor is less than the SPBM, then the header is known to be below Set Point B. The gain factor or multiplier may then be applied to the signal when the signal magnitude is less than the SPBM so as to improve the responsiveness of the header height control system when the header is at or below Set Point B.

The gain factor used for signals above Set Point B (hereinafter the "Above B Gain" (ABG) is preferably about one, but may be any whole or fractional number. The gain factor used for signals below Set Point B (hereinafter the "Below B Gain" (BBG) is preferably more than one to about ten times greater than the ABG. The gain factor used for the BBG and for the ABG (if any) is preferably such that, after applying the gain factor, the slope of the plot of the magnitude of the height sensor output signal versus the header height is substantially constant across the entire height range of the header from Set Point A to Set Point C as indicated by solid line 70 in FIG. 7, for example. It should be appreciated that by making the signal magnitude substantially linear across the entire height range of the header from Set Point A to C, the effective sensor sensitivity will necessarily be made substantially uniform as indicated by solid lines 72 and 74 in FIGS. 8 and 9, respectively.

As disclosed in U.S. Pat. No. 7,647,753 ("U.S. Pat. No. 7,647,753"), the Set Point B (and thus the SPBM) may be determined manually by visually identifying when the snout tip touches the ground and identifying the SPBM at that point, or by automatically detecting the point at which the snout touches the ground by employing other sensors to detect when the snout begins to rotate. Alternatively, as disclosed in International Patent Publication No. WO2014/127043 ("WO2014127043"), the BBG and ABG gain factors may be determined independently of the geometry or position of the height sensors 16 and/or geometry of the header.

Automatic Calibration of Header Controller When the Height Sensor is Mounted on a Pivoting Element of the Header To calibrate the header control system 100 to automatically determine Set Point B and the gain factor to be applied, the output signal magnitudes of the height sensors are sampled and recorded with respect to the change in height of the header as it moves through a range of motion in order to correlate the output signal magnitudes with respect to the actual height of the header above the ground. The range of motion may be from a raised position to a lowered position or from a lowered position to a raised position. The correlation of the output signals to actual height of the header above the ground may be determined by sampling the output signals of the height sensors as the header is moved through a range of motion at a constant speed or by associating the output signals of the height sensors with other positional sensors monitoring another element of the machine 10 to which the header 12A is attached, for example the positional sensors on the feeder house 17 of the combine.

For example, in one embodiment the operator may be instructed to raise the header to its maximum height and to then begin lowering the header at a constant drop speed or drop rate until the header is resting on the ground (i.e., Set Point C). As the header is being lowered, the signal modifier interface 102 (e.g., the Insight® controller as previously referenced) will sample the output signals across all the height sensors 16. A sampling rate of 100 Hz may be suitable, but other desired sampling rates may also be used. Assuming the same representative output signals as discussed above in connection with FIG. 7B, it should be appreciated that the height sensor output signals will remain substantially constant and will presumably be at their maximum due to being fully extended (e.g., 4.5 V) until the header is lowered to the point that one of the height sensors 16 makes contact with the ground surface and begins to rotate. Upon detecting the first output signal change from the height sensor, the interface 102 initiates a clock or timer to time stamp the first output signal change, and records the output signal magnitude at that first time stamp thereby establishing Set Point A and the "Set Point A Magnitude" (SPAM) for that height sensor. This same process occurs for each of the height sensors.

As the header continues to lower at a constant rate to the Set Point C position, the interface 102 continues to successively time stamp and record the height sensor output signals at the sampling rate (e.g., 100 Hz) for each of the height sensors. When the header reaches the Set Point C position and the interface 102 detects the last change to the height sensor output signal over a predetermined sampling period, the timer is stopped establishing the Set Point C position and the last to change output signal magnitude is recorded as the "Set Point C Magnitude" (SPCM). This same process occurs for each of the height sensors.

In an alternative embodiment, for example, as the header is being lowered or raised, the signal modifier interface 102 (e.g., the Insight® or Horizon® controller as previously referenced) may be programmed to sample the output signals across all the height sensors 16 based on incremental signal changes received from the position sensors of the feeder house 17 or other positional sensor associated with movement of the header 12A. For example, the interface 102 may be programmed to record the output signal magnitudes of each of the height sensors at every 0.01 voltage change of the feeder house position sensor. Thus, assuming the feeder house is first raised to its maximum height and is then lowered, upon detecting the first output signal change from the height sensor, the interface 102 records the output signal magnitude from the height sensor and the associated output signal from the feederhouse position sensor, thereby establishing Set Point A and the SPAM for that height sensor relative to the feeder house height. This same process occurs for each of the height sensors. As the header continues to be lowered, the interface 102 may be programmed to record the signal magnitudes from each of the height sensors at every 0.01 voltage change of the feeder house sensors until the feeder house position sensor indicates that the feeder house is at its lower most position establishing the Set Point C position at which point the interface 102 records the output signals of each of the height sensors 16 at that position, thereby establishing the SPCM for each of the height sensors.

In an alternative embodiment in which non-contact sensors are employed, once the SPCM is established by sampling the output signal magnitude when the header is lowered to the Set Point C position (i.e., the lowest point in the range of motion of the header), which may be detected by the position sensors on the feederhouse or other supporting element associated with movement of the header, the Set Point A position and thus the SPAM may be established at any desired elevation above the Set Point C position, such as at the upper height or elevation at which the header is expected to operate in the field.

With all the output signals recorded across each of the height sensors between Set Point A and Set Point C, deviations in the rate of change of the signal magnitudes between Set Point A and C can be identified by analyzing the differences in the recorded signal magnitudes between the successive samplings (i.e., whether based on time stamps or the incremental signal changes of an associated position sensor). For example, by comparing the difference between the SPAM and the signal magnitude of the next successive sampling point, the initial rate change or slope will be substantially linear with the next successive signal magnitude until the snout tip makes contact with the ground at which point the slope will begin to change. Accordingly, if the interface 102 is programmed to compare each one of the successively recorded signal magnitudes beginning with the SPAM, the interface will be able to identify the first occurrence of nonlinearity which will establish the "Set Point B" position and the corresponding SPBM. The same process may be performed for each of the height sensors.

With SPBM now known, the interface 102 is programmed to calculate the difference in the slope of the output signal from Set Point A to Set Point B (i.e., the slope of the line 70 in FIG. 7) versus the slope from Set Point B to Set Point C (i.e., the slope of the dashed line 50 in FIG. 7 to the left of Set Point B). The differences in the slopes from Set Point A to B and from Set Point B to C, will correspond to the gain factor that is needed to modify the signal magnitudes which are below the SPBM to bring them into substantial linearity with the slope from Set Point A to B. Alternatively, once the SPBM is identified, it may be desirable to consider a subset of the signal magnitudes on either side of the SPBM for purposes of comparing the slopes on either side of the SPBM to take into account any nonlinearity of the slopes of the signal magnitudes in a range closer to the SPBM.

The recorded signal magnitudes may be correlated with the corresponding actual heights of the header above the ground surface by associating the signal magnitudes between Set Points A, B and C with the known height sensor or height sensor arm configuration and known header configurations based on make and model of the combine and header previously programmed into the interface 102 or input into the combine monitor with which the interface 102 interfaces. For example, if the output signals at Set Points A, B and C are recorded, these values can be correlated with expected output signals at Set Points A, B and C pre-programmed into the interface 102 for different makes and models of combines, headers and sensors 16. If discrepancies are identified between the actual output signals from the expected output signals at Set Points A, B and C for the known makes and models, this information can also be used to diagnose set-up errors with the header or problems with the sensors as disclosed in WO2014127043.

The interface 102 is programmed to apply BBG to any detected output signal magnitudes that are below the SPBM in order to modify the slope of the output signal below Set Point B (i.e., from Set Points B to C or a subset thereof) to have the same or substantially the same slope as the output signal above Set Point B (i.e., from Set Points B to A or a subset thereof). If an ABG is desired to modify the output signals greater than the SPBM, the interface 102 may be programmed to apply any pre-programmed whole or fractional number to those output signals greater than the SPBM.

With the BBG and ABG gain factors known, the modified output signal corresponding to header heights above Set Point B may be represented by the following equation:

Modified Signal Above Set Point $B$=SPBM+((measured signal magnitude−SPBM)×ABG)

Similarly, the modified signal corresponding to header heights below Set Point B may be represented by the following equation:

Modified Signal Below Set Point $B$=SPBM−((SPBM−measured signal magnitude)×BBG)

It should be appreciated that by applying the different gain values to the output signal magnitudes above and below Set Point B as discussed above, the effective sensor sensitivity will be uniform or more substantially uniform as indicated by solid lines 72 and 74 in FIGS. 8 and 9A, 9B respectively, from Set Point A to Set Point C, thereby improving the responsiveness of the header height control system when the crop divider snout tips are being run at or near on the ground surface.

It should also be appreciated that in order to ensure that modified output signal magnitudes are within the acceptable input ranges for the comparator 56/controller 60 (e.g. between ranges between 0.5 volts and 4.5 volts), it may be necessary to shift the output signal magnitudes. For example, if the slope of the output signals in FIG. 7A, 7B was steeper due to a different sensing arm configuration such that the actual detected output signal magnitude of the sensor at Set Point C was found to be 2.0 volts thereby resulting in a modified signal magnitude at Set Point C (i.e. SPCM) being 0.4 volts (i.e., 2.6−((2.6−2.0)×3.5), then it would be necessary to shift the signal plot upwards while maintaining the same slope to ensure that the header controller system would still receive this modified signal at Set Point C. One way to provide such a magnitude shift while maintaining the same slope is to set the actual magnitude of the signal at Set Point A (i.e., SPAM) to the maximum signal range and adjusting all the detected signals by this incremental difference. For example if the actual detected SPAM is 3.4 volts, all of the detected signal magnitudes may be adjusted upwardly by 1 volt such that the SPAM is reset to 4.4 volts (the maximum voltage accepted by most header control systems while allowing for a slight margin of error). The corresponding SPCM will thus be 1.4 volts (i.e., 0.4+1.0).

Although the embodiment described herein describes the pivot point 36 as the pre-established point on the header for determining header height above the ground surface, it should be appreciated that Set Point B may be a reference to any point on the header above the ground surface at which there is a discontinuity in the slope of the output signal. The purpose of which is simply to identify the magnitudes of the signal from the height sensor 16 at Set Point B (wherever the reference point may be) so that the resulting output of the comparator 56/controller 60 can be modified as described above.

It should also be noted that some height sensors 16 are configured to generate signals with opposite magnitudes than described above, i.e., signals of greater magnitude are generated at lower header heights and signals of lower magnitude are generated at higher header heights. For simplicity, it is presumed that the height sensor generates lower magnitude signals below Set Point B than above Set Point B. However, header height control systems may alternatively utilize signal magnitudes which are inverted (i.e., higher magnitude signals above Set Point B than below Set Point B). Therefore, any discussion in this specification or in the appended claims with respect to the signal magnitudes increasing above Set Point B or decreasing below Set Point B should be understood as being equally applicable to systems in which the signal magnitudes of the height sensors are switched above and below Set Point B.

Automatic Calibration of Header Controller When the Height Sensor is Not Mounted on a Pivoting Element of the Header The foregoing system and method of calibrating header controllers for headers in which the sensor is mounted to a pivoting element (e.g., the snouts on corn headers 12A) is substantially the same for calibrating header controllers where the height sensor is not mounted on a pivoting element, such as on platform headers and draper headers for harvesting small grain (collectively hereinafter "non-pivoting headers" 12B). However, in such applications, it should be appreciated that because the sensor is not mounted on a pivoting element, there will be no abrupt change in the signal magnitudes between Set Points A and C and therefore it is unnecessary to perform the steps identified above to detect the Set Point B position and/or the SPBM for purposes of applying a BBG value to the signals. Otherwise all of the foregoing embodiments and methods are equally applicable to non-pivoting headers 12B.

Accounting for Change in Header Pitch on Corn Headers

Figure 11:
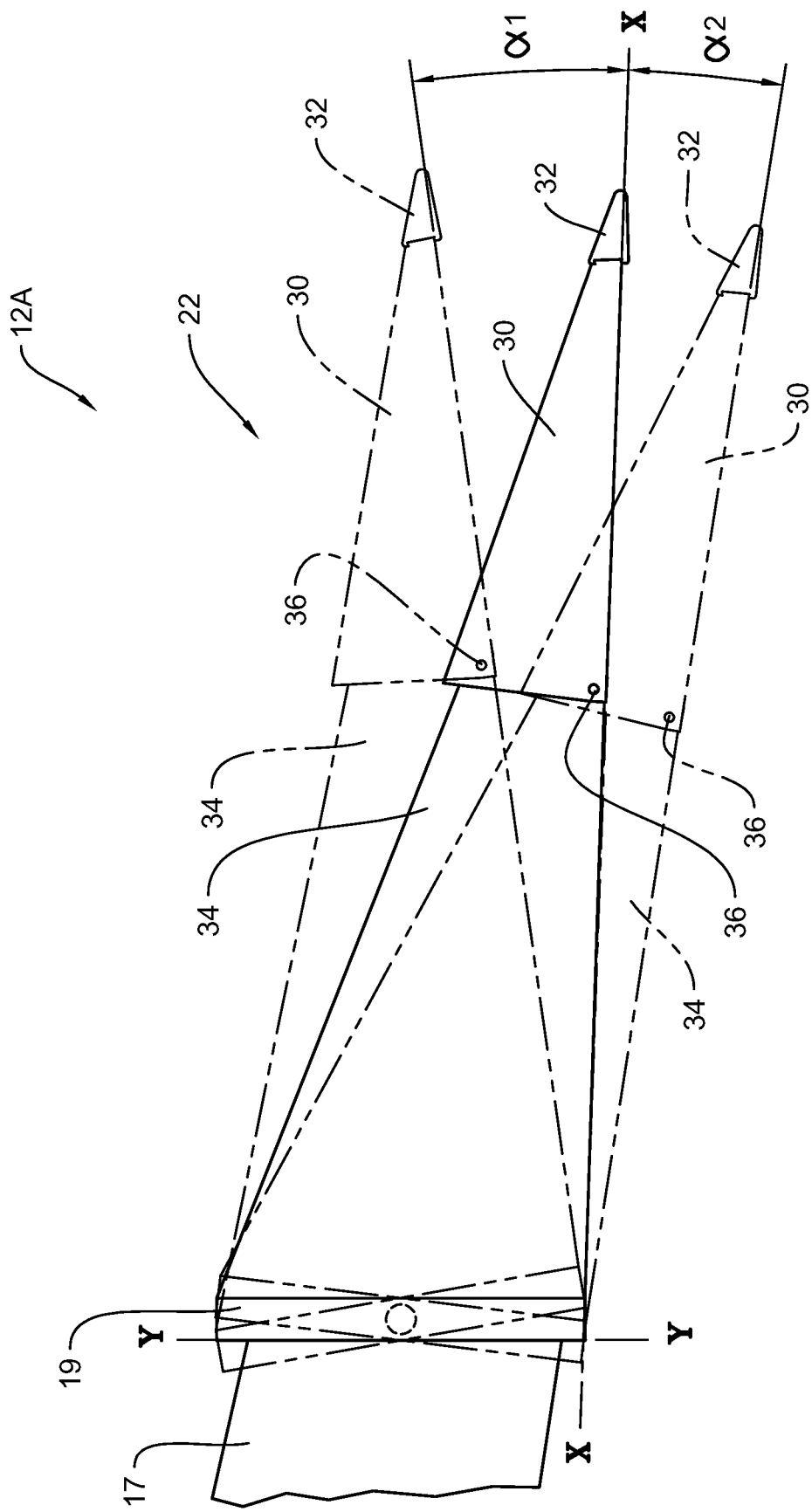
FIG. 11 is an enlarged side elevation view of a corn header showing the header pitch angle range above and below the Zero Pitch Angle.

FIG. 11 illustrates a corn header 12A showing an operating pitch angle range of the corn header 12A with negative pitch angle α1 above a reference plane X-X and a positive pitch angle α2 below the reference plane X-X, wherein the reference plane X-X is defined by a line extending from the lower rearward end of the header to the forward-most tip of the header when the feederhouse frame 19 is disposed vertically along a Y-Y plane (hereinafter referred to as the "Zero Pitch Angle"). As previously identified, the snout 30 may be separately pivoted downwardly about the pin 36 which would change the slope of the X-X plane from horizontal as defined above, but the pitch angles α1, α2 of the header would still have the same range.

Figure 12:
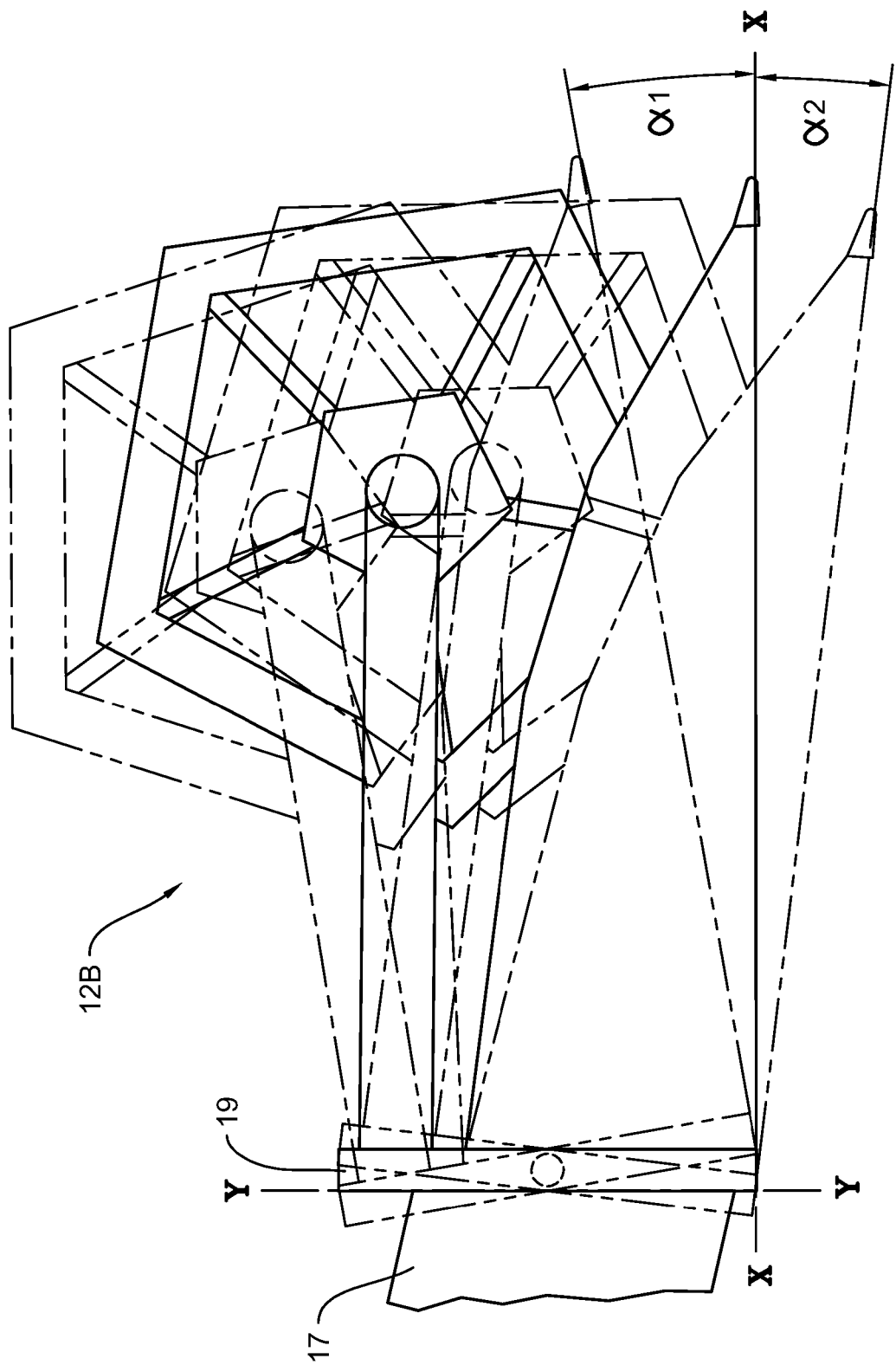
FIG. 12 is an enlarged side elevation view of a grain header showing the header pitch angle range above and below the Zero Pitch Angle.

Similarly, FIG. 12 illustrates a grain header 12B showing the operating pitch angle range of the grain header 12B with an negative pitch angle α1 above a reference plane X-X and a positive pitch angle α2 below the reference plane X-X, wherein the plane X-X is defined by the position of the header with the feederhouse frame 19 disposed vertically along a Y-Y plane (i.e., the Zero Pitch Angle).

The pitch angle may be determined by any suitable sensor positioned to detect a change in the angle of the header or component of the header with respect to a reference point or plane. By way of example only, a sensor may be positioned to detect the change in the angle of the feederhouse frame 19 with respect to a point on the feederhouse 17 or with respect to a surface on the header so as to detect relative angular relationships. Another non-limiting example may include a sensor disposed to detect the linear movement of the hydraulic cylinders which are actuated to change the header pitch.

Figure 13:
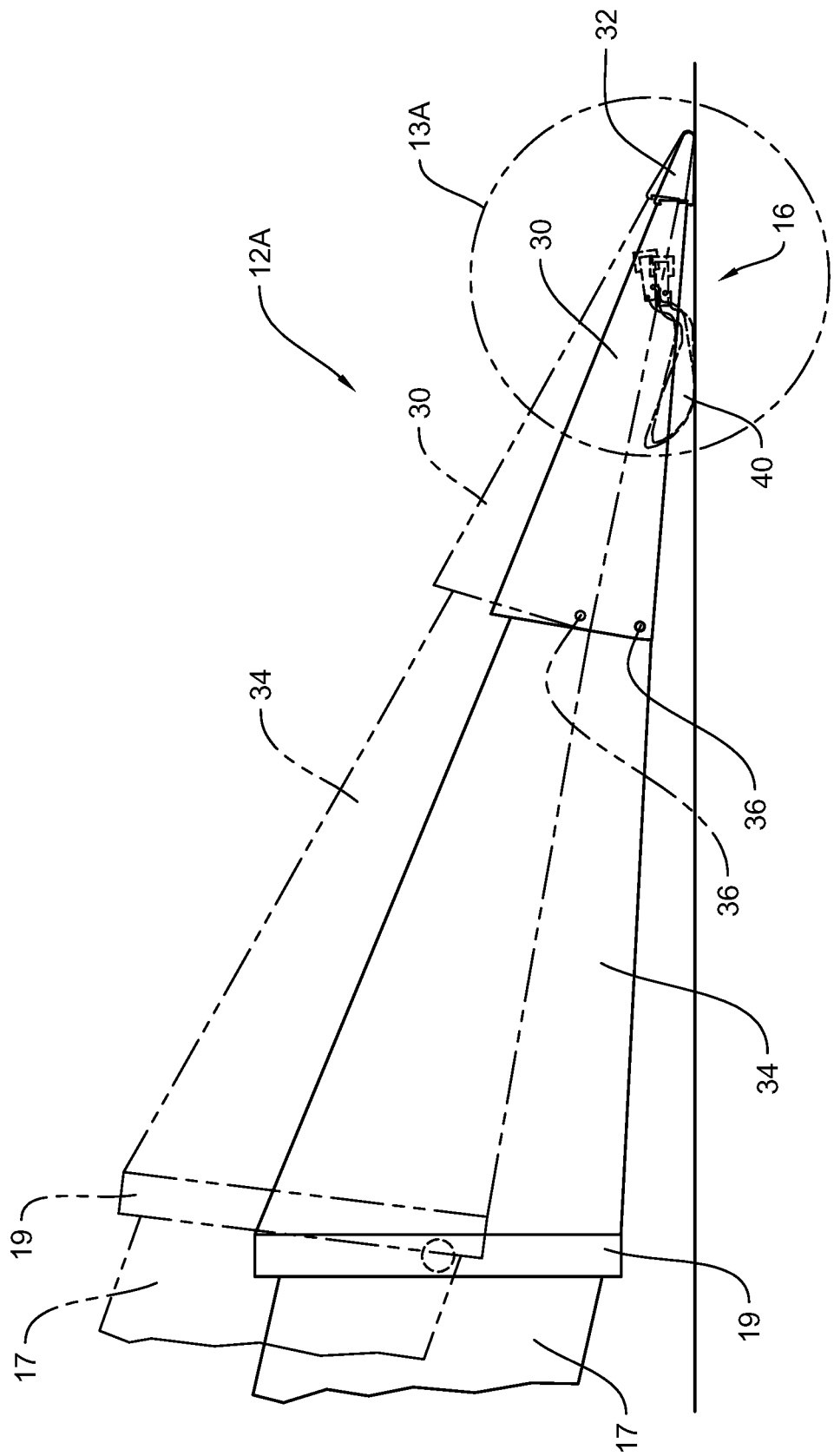
FIG. 13 is a side elevation view of the corn header of FIG. 11 showing the change in relative position of the height sensor and the change in relative position of the feederhouse at different pitch angles when the operator maintains the snout tip on the ground surface.
Figure 15:
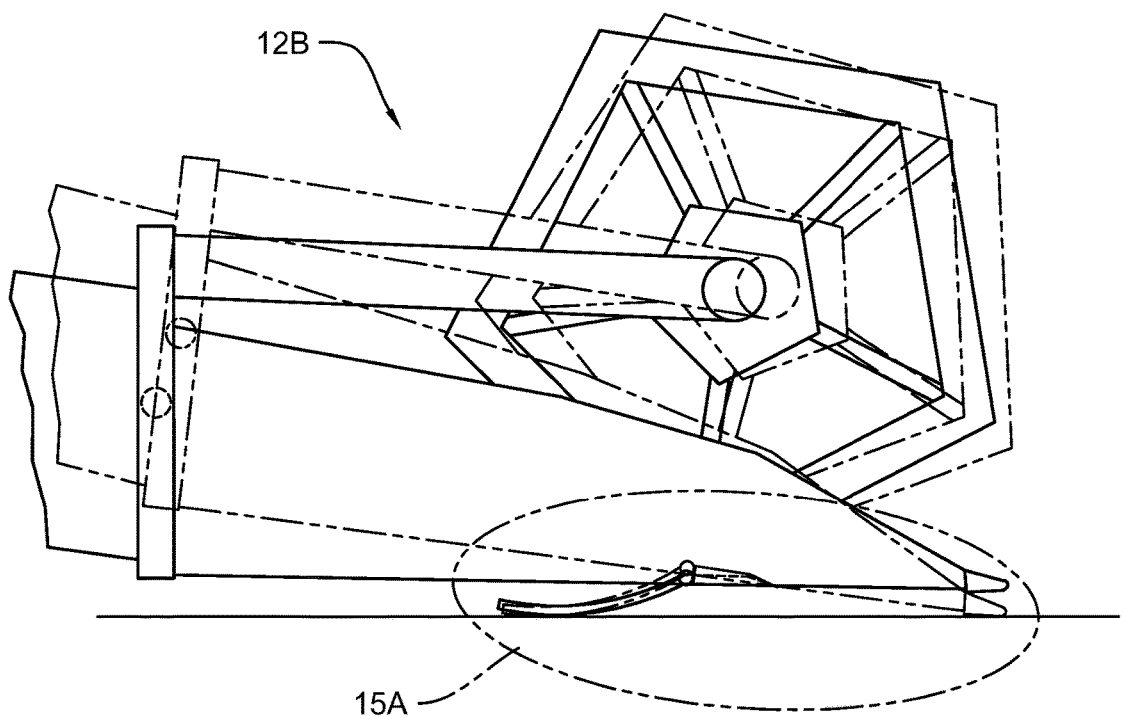
FIG. 15 is a side elevation view of the grain header of FIG. 12 with a height sensor mounted rearward of the cutterbar and showing the change in relative position of the height sensor and the change in relative position of the feederhouse when the operator maintains the cutterbar at or near the ground surface at different pitch angles.
Figure 16:
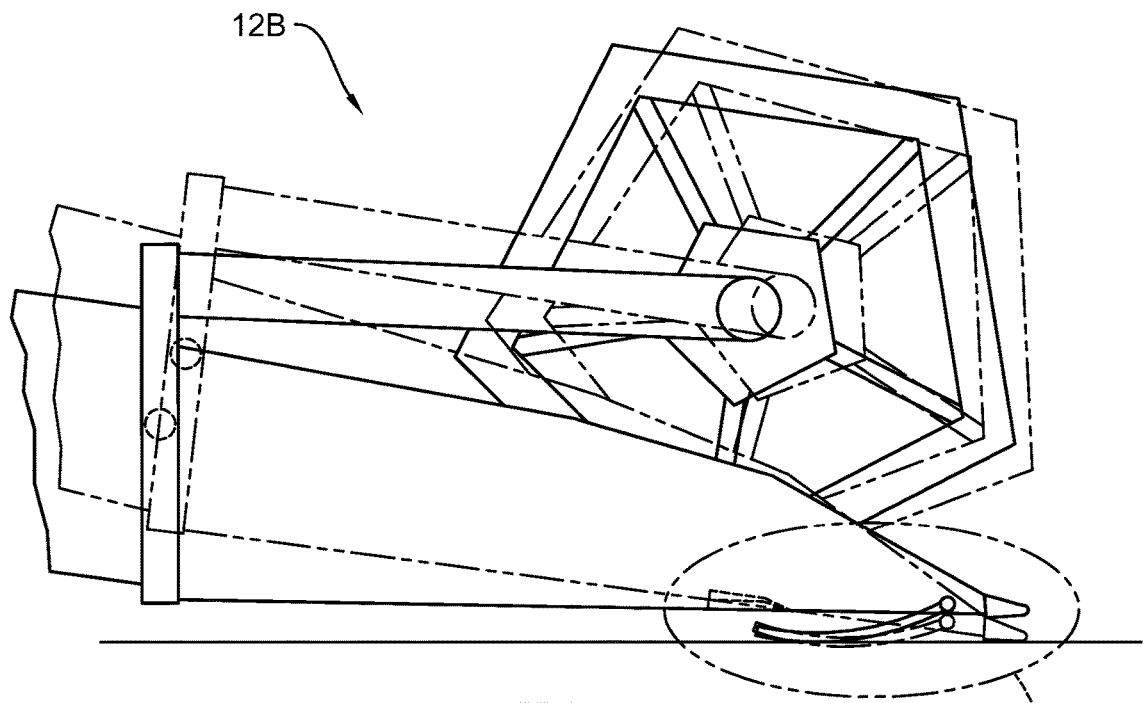
FIG. 16 is a side elevation view of the grain header of FIG. 12 with a height sensor mounted forward of the cutterbar and showing the change in relative position of the height sensor and the change in relative position of the feederhouse when the operator maintains the cutterbar at or near the ground surface at different pitch angles.

Referring to FIG. 13, it should be appreciated that if the operator desires to operate a corn head with the tips at the same elevation from the ground regardless of pitch angle, then the height of the feederhouse will be at a different elevation depending on whether the header is pitched at a positive pitch angle from the Zero Pitch Angle or if the header is pitched at a negative pitch angle from the Zero Pitch Angle. Similarly, as shown in FIGS. 15 and 16, assuming the operator wants to run a grain head 12B with the cutterbar 90 at the same elevation from the ground regardless of pitch angle, then the height of the feederhouse will be at a different elevation depending on whether the header is pitched at a positive pitch angle from the Zero Pitch Angle or if the header is pitched at negative pitch angle from the Zero Pitch Angle. FIG. 13 shows the corn header 12A at Set Point B (i.e., with the tips on the ground surface), when the header is at different pitch angles. FIGS. 15 and 16 show the grain header 12B at or near Set Point C (i.e., with the cutterbar 90 at or near the ground surface) when the header is at different pitch angles.

Figure 13A:
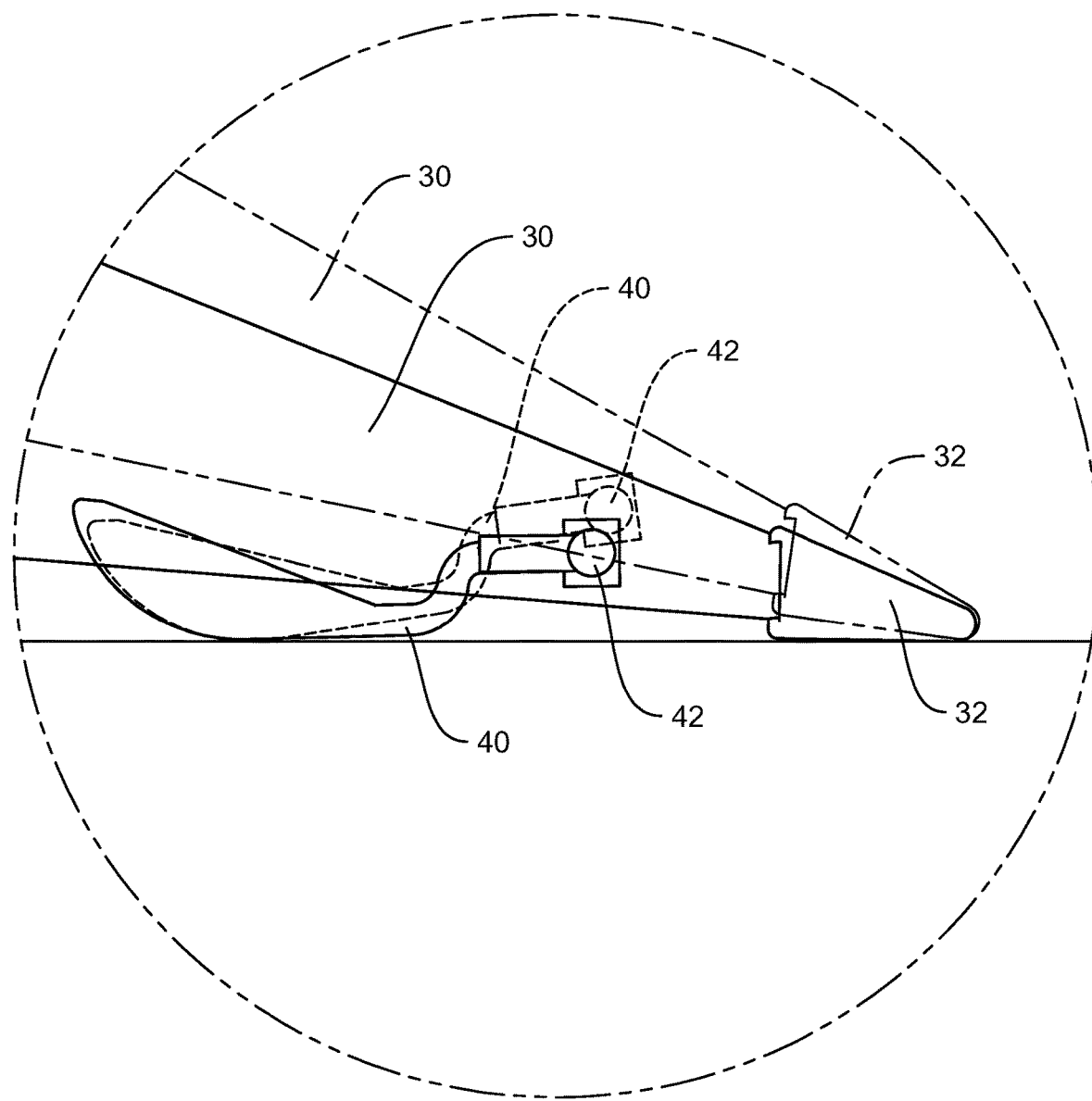
FIG. 13A is an enlarged view of the circled area of FIG. 13.

FIG. 13A is an enlarged view of the tip of the snout shown in FIG. 13. It can be seen in FIG. 13A that when the pitch of the header is changed from the Zero Pitch Angle (solid lines) to positive downward pitch angle (phantom lines), there is a change in the position of the rotation sensor 42, and thus a corresponding change in the amount of rotation of the sensor arm 40 which results in a change in the output signal of the rotation sensor 42, despite the snout tip 32 remaining at substantially the same position (i.e., at Set Point B). This change in the output signal must be accounted for if the output signal of the rotation sensor is to accurately reflect the height of a reference point on the header (in this case the snout tip 32) relative to the ground.

The change in the output signal due to the change in elevation of the rotation sensor resulting from the change in header pitch is reflected in FIG. 14A which show the signal magnitudes 50A and slope 70A shifted upward from the signal magnitude 50 and slope 70 with the header 12A at the Zero Pitch Angle. Specifically, the dashed line 50A in FIG. 14A represent the plot of the voltage output to header height between Set Points A and C when the header is at a positive pitch angle (i.e., as shown phantom lines in FIGS. 13 and 13A). The dashed line 50 in FIG. 14A represents the plot of the voltage output to header height between Set Points A and C when the header is at the Zero Pitch Angle (i.e., as shown in solid lines in FIGS. 13 and 13A). Both plot lines 50 and 50A show that the change in the magnitude of the output signal of the height sensor 16 is substantially linear between Set Point A and Set Point B. However, as previously explained in connection with FIG. 7A, as the header continues to move downwardly beyond Set Point B, the slope of the dashed lines 50 and 50A change because the actual header height no longer has the same substantially linear proportionality to the rotational movement of the arm 40 since the rotation of the arm 40 changes very little relative to the snout due to the snout pivoting. It should be appreciated that if the header 12A has a negative pitch, the output signal magnitude would be shifted downwardly, to reflect that the output signal magnitudes would be less than the output signal magnitude for the header at the Zero Pitch Angle, because the arm 40 would be rotated further.

To account for the shift in signal magnitude depending on header pitch angle, a Correction Factor ("CF") is applied to the output signal. The Correction Factor is the product of the header pitch angle and a scale factor ("SF"). The scale factor SF may be determined based on empirical data by testing different makes and models of headers. Based on using some of the most popular makes and models of corn headers tested at different pitch angles, a scale factor SF between 0.030 and 0.040 volts per degree of angular change of the pitch angle (for a 5 volt sensor as previously referenced) encompasses most corn headers. The scale factor SF may also be determined automatically by sampling the SPAM, SPBM and SPCM across a predefined range of header pitch angles above and below the Zero Pitch Angle.

By way of example, assuming the corn header has a positive pitch angle of 10 degrees from the point where it was calibrated (which is assumed to be the Zero Pitch Angle) and assuming a scale factor SF of 0.035 (which is approximately the mean between the empirical range of 0.030 and 0.040), the correction factor CF would be +0.35 (i.e., +10 degrees×0.035). The correction factor CF is then applied to the measured signal magnitude of the height sensors, resulting in a corrected signal magnitude. For example, assuming the same header pitch (i.e., a positive 10 degree pitch), and assuming the measured signal magnitude of the height sensor at Set Point B is 2.35 volts, the Corrected Set Point B Magnitude (CSPBM) would be 2.70 volts (i.e., 2.35+0.35). As another example, assuming the header has a negative pitch of 5 degrees from the Zero Pitch Angle at which it was calibrated, and assuming the same scale factor (SF) of 0.035, and assuming the measured signal magnitude of the height sensor at Set Point B is 2.35 volts, the Corrected Set Point B Magnitude (CSPBM) would be 2.175 volts (i.e., 2.35+(−5×0.035)). Alternatively, if the header was calibrated at a negative pitch of 5 degrees and the pitch angle is pitched downwardly or positively therefrom by 10 degrees (resulting in a positive 5 degree downward pitch), the correction factor CF would be 0.35 (i.e., 10 degrees×0.035) and would be added to the signal magnitude measured at the negative 5 degree pitch resulting in the corrected Set Point B Magnitude to be used at the positive 5 degree pitch. Thus, assuming the measured signal magnitude of the height sensor at Set Point B is 2.175 volts, the Corrected Set Point B Magnitude (CSPBM) would be 2.525 volts (i.e., 2.175+(10×0.035))

Figure 14:
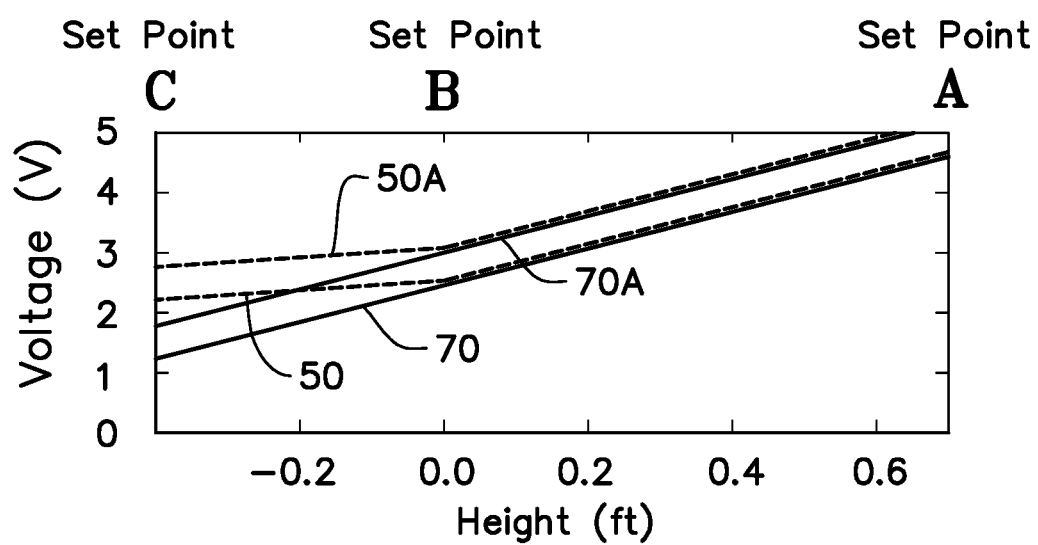
FIG. 14 is a diagram representing the change in height sensor output signal (in volts) with respect to height as the header is lowered from Set Point A to Set Point C while the header is in a positive pitch angle in comparison to the height sensor output signal when the header is at a Zero Pitch Angle.

With CSPBM now known, the interface 102 is programmed to calculate the difference in the slope of the output signal from Set Point A to Set Point B (i.e., the slope of the line 70A in FIG. 14A) versus the slope from Set Point B to Set Point C (i.e., the slope of the dashed line 50A in FIG. 14 to the left of Set Point B). The differences in the slopes from Set Point A to B and from Set Point B to C, will correspond to the gain factor that is needed to modify the signal magnitudes which are below the CSPBM to bring them into substantial linearity with the slope from Set Point A to B. However, it is recognized that there will be a slight difference in slope from Set Point B to C due to the new pitch position for which an additional BBG correction factor may be applied.

The interface 102 may be programmed to apply the BBG to any detected output signal magnitudes that are below the CSPBM in order to modify the slope of the output signal below Set Point B (i.e., from Set Points B to C or a subset thereof) to have the same or substantially the same slope as the output signal above Set Point B (i.e., from Set Points B to A or a subset thereof). If an ABG is desired to modify the output signals greater than the CSPBM, the interface 102 may be programmed to apply any pre-programmed whole or fractional number to those output signals greater than the CSPBM.

Thus, for headers having pitch above or below the Zero Pitch Angle, the modified output signal corresponding to header heights above Set Point B, may be represented by the following equation:

Modified Signal Above Set Point B (accounting for header pitch)=CSPBM+((measured signal magnitude−CSPBM)×ABG)

Similarly, for headers pitched above or below the Zero Pitch Angle, the modified signal corresponding to header heights below Set Point B may be represented by the following equation:

Modified Signal Below Set Point B (accounting for header pitch)=CSPBM−((CSPBM−measured signal magnitude)×BBG)

It should be appreciated that by applying the different gain values to the output signal magnitudes above and below Set Point B as discussed above, the effective sensor sensitivity will be uniform or more substantially uniform, thereby improving the responsiveness of the header height control system when the crop divider snout tips are being run at or near on the ground surface and when the header is pitched at an angle above or below the Zero Pitch Angle.

Accounting for Change in Header Pitch on Grain Heads

Figure 15A:
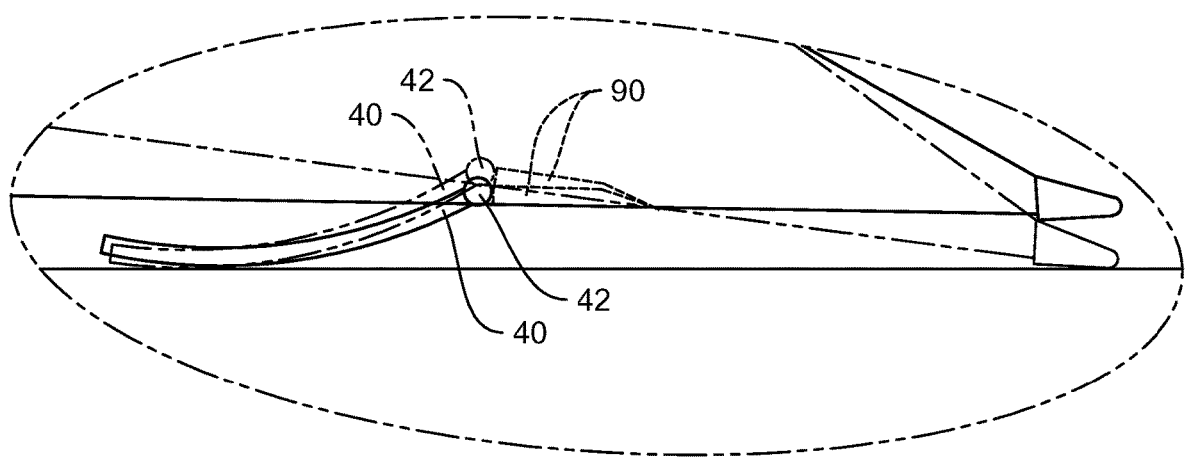
FIG. 15A is an enlarged view of the circled area of FIG. 15.
Figure 16A:
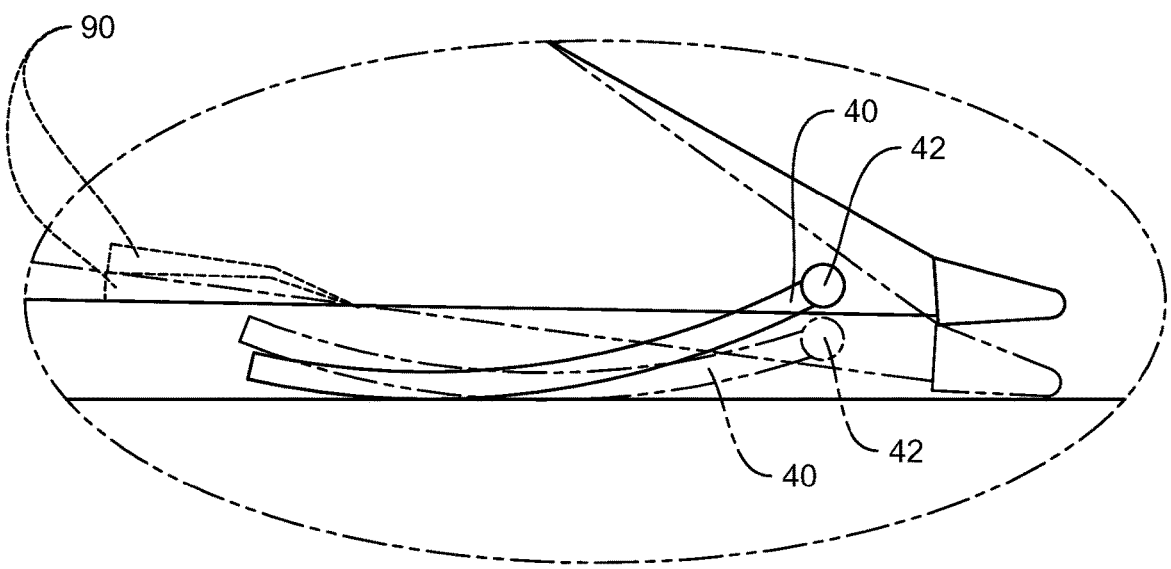
FIG. 16A is an enlarged view of the circled area of FIG. 16.
Figure 17:
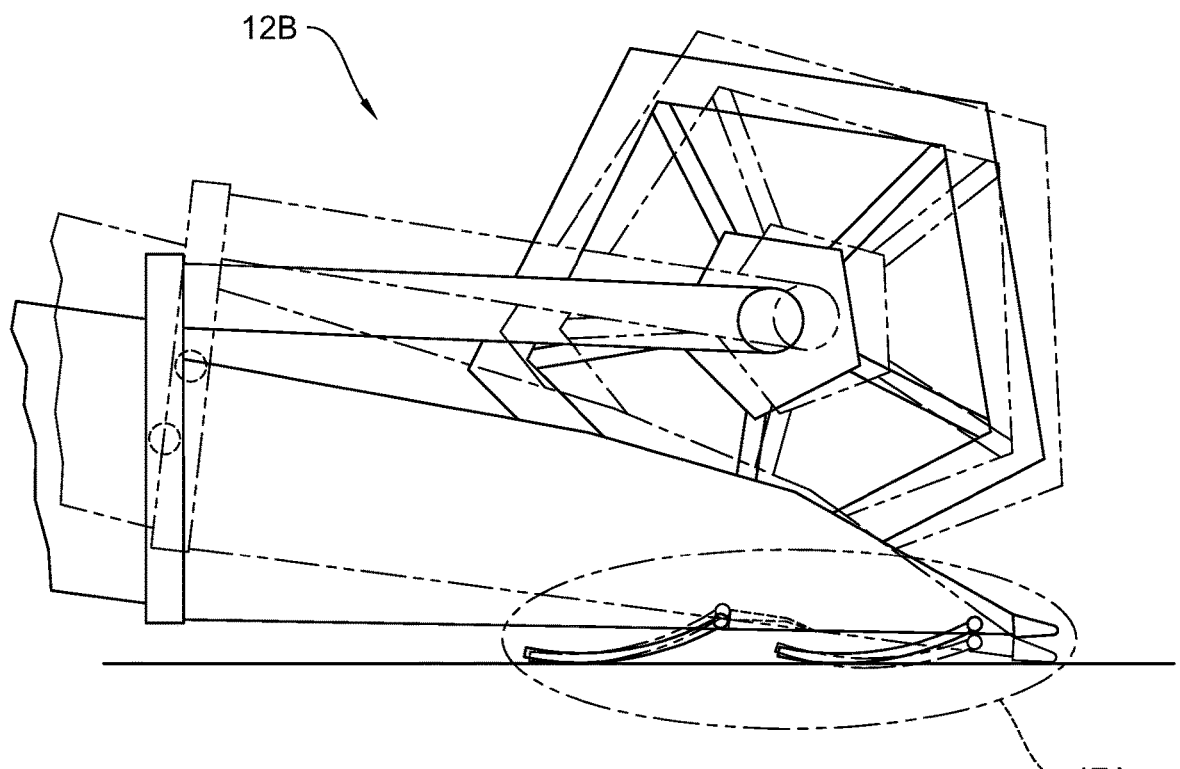
FIG. 17 is a side elevation view of the grain header of FIG. 12 with height sensors mounted both forward and rearward of the cutterbar and showing the change in relative position of the respective forward and rearward height sensors and the change in relative position of the feederhouse when the operator maintains the cutterbar at or near the ground surface at different pitch angles.
Figure 17A:
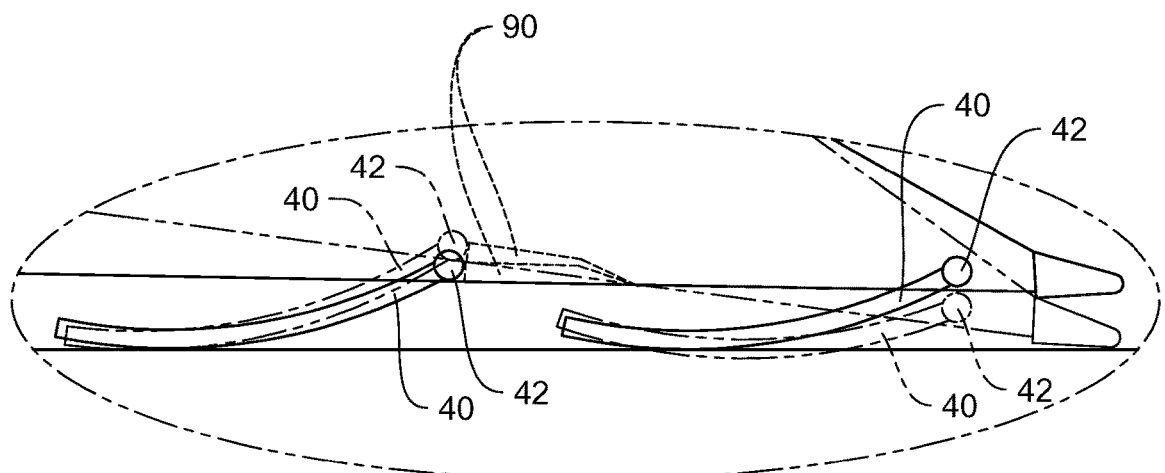
FIG. 17A is an enlarged view of the circled area of FIG. 17.

It should be understood that for a grain header 12B having height sensors 16 mounted rearward of the cutterbar 90 (see FIGS. 15 and 15A), if the header has a positive (downward) pitch angle, the rotation sensor 42 or the point at which the height sensor arm 40 pivots will move upwardly from the point at which the height sensor would be located at the Zero Pitch Angle. Conversely, if the height sensors 16 are mounted rearward of the cutterbar 90 and the header has a negative (upward) pitch, the point at which the height sensor mounts to the header 12B will move downwardly from the point at which the height sensor would be located at the Zero Pitch Angle. On the other hand, if the height sensor 16 is attached to the header 12B forward of the cutterbar 90 (see FIGS. 16 and 16A), and the header has a positive (downward) pitch angle, the rotation sensor 42 or the point at which the height sensor arm 40 pivots will move downwardly from the point at which the height sensor would be located at the Zero Pitch Angle. Conversely, if the height sensor 16 is attached to the header 12B forward of the cutterbar 90, and the header has a negative (upward) pitch angle, the point at which the height sensor mounts to the header will move upwardly from the point at which the height sensor would be located at the Zero Pitch Angle. If the grain header includes height sensors mounted both forward and rearward of the cutterbar 90 (see FIGS. 17 and 17A), the change in pitch angle must be taken into account for each sensor. The same is true if the height sensors 16 are mounted at different positions (forward or rearward) with respect to the cutterbar. Furthermore, although reference is made to the height sensors with respect to the cutterbar 90, it should be appreciated that other components of the head could be used as the reference location.

As previously explained when a height sensor 16 is mounted on a grain header 12B (i.e., a header with a non-pivoting element), there will be no abrupt change in the signal magnitudes between Set Points A and C and therefore it is unnecessary to perform the steps identified above to detect the Set Point B position and/or the SPBM for purposes of applying a BBG value to the signals. Rather, for grain heads, a critical elevation is when the cutter bar or other crop engaging element is positioned at or near the ground, i.e. Set Point C, and therefore the SPCM is the critical output signal magnitude to which the correction factor is applied to account for the change in header pitch.

By way of example, assuming the height sensor is mounted rearward of the cutter bar and the grain header is pitched downwardly at a positive 10 degrees from the point where it was calibrated (which is assumed to be the Zero Pitch Angle), the Corrected Set Point C Magnitude (CSPCM) would be determined using the following equation:

CSPCM=SPCM+(SF×+10)

As previously discussed the scaling factor (SF) may be determined by performing tests with the grain header at positive and negative pitch angles and interpolating the corrected CSPCM between those two. Alternatively, the SF may be determined by measuring the SPCM at a first pitch angle, subtracting the SPCM at a second pitch angle and dividing the difference of the SPCMs by the overall change in the pitch angles between the first pitch angle and the second pitch angle.

On the other hand, assuming the height sensor is mounted rearward of the cutter bar and the grain header is pitched upwardly at a negative 5 degrees from the Zero Pitch Angle from the point where it was calibrated, the Corrected Set Point C Magnitude (CSPCM) would be determined using the following equation:

CSPCM=SPCM+(SF×−5)

By way of another example, assuming the height sensor is mounted forward of the cutter bar and the grain header is pitched at a positive pitch angle of 10 degrees from the point where it was calibrated (which is assumed to be the Zero Pitch Angle), the Corrected Set Point C Magnitude (CSPCM) would be determined using the following equation:

CSPCM=SPCM+(SF×10)

However, in this configuration the scale factor SF would be a negative scale factor determined by either of the methods described above.

Likewise, assuming the height sensor is mounted forward of the cutter bar and the grain header has a negative 5 degree pitch from the point where it was calibrated (which is assumed to be the Zero Pitch Angle), the Corrected Set Point C Magnitude (CSPCM) would be determined using the following equation:

CSPCM=SPCM+(SF×−5)

Again, in this configuration the scale factor SF would be a negative scale factor determined by either of the methods described above.

Based on the examples above, it should be appreciated, that if the grain header has height sensors mounted both forward and rearward of the cutterbar, different scale factors (one being positive and the other negative) would be applied to the respective forward and rearward height sensors.

Figure 18:
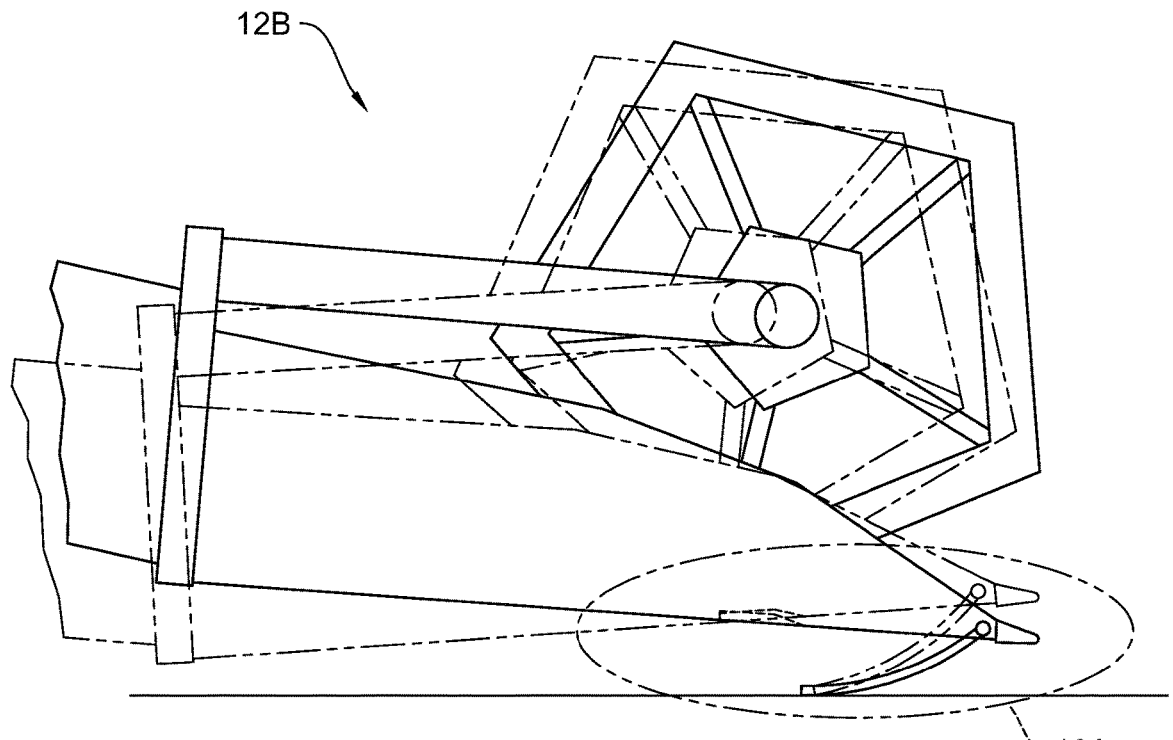
FIG. 18 is a side elevation view of the grain header of FIG. 12 with height sensors mounted forward of the cutterbar and showing the change in relative position of the respective forward sensors and the change in relative position of the feederhouse when the operator maintains the cutterbar at or near the ground surface at a negative pitch angles.
Figure 18A:
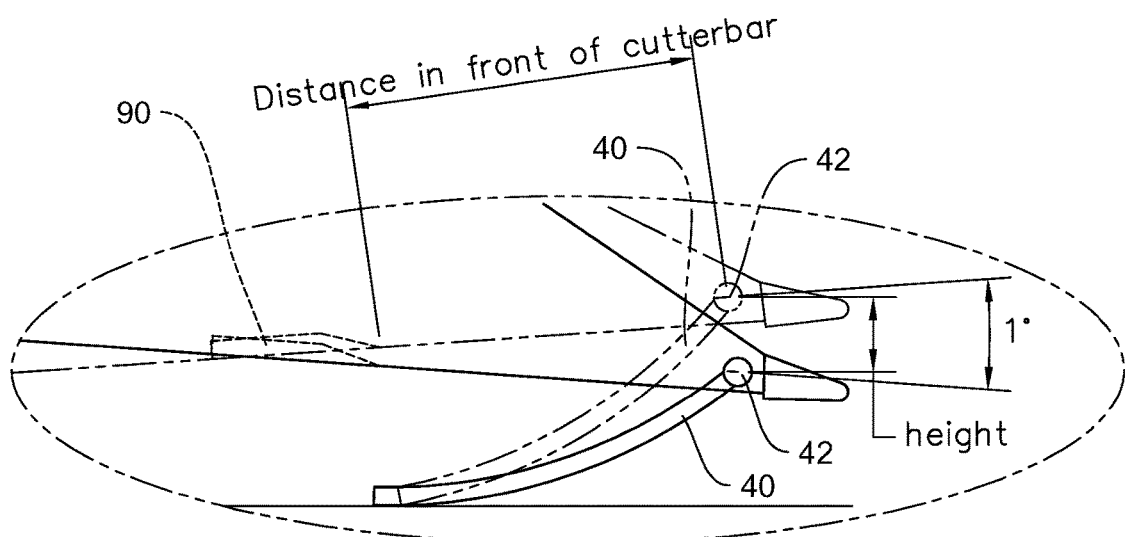
FIG. 18A is an enlarged view of the circled area of FIG. 18 showing, as an example, the scale factor at a 1° negative pitch (with the angle exaggerated for clarity).

If it is desired to know the true or actual distance between the ground and a critical reference point or element (such as the cutterbar or other crop engaging element) due to a change in pitch angle, the scale factor per one degree pitch and corresponding correction factor (i.e., the amount of height correction needed) to account for the total change in pitch angle can be determined based on the following equations with reference to FIGS. 18 and 18A:

Scale Factor(SF)=(Distance in front of critical element)×((−1)))sin(1°))

Correction Factor(CF)=SF×(total angle change)

By way of example, using the above equations and assuming the height sensor is mounted 200 mm forward of the critical reference element (e.g., the cutterbar), and assuming the header is pitched aft ten degrees (i.e., the total degree change is −10°), the scale factor for each 1 degree change in pitch angle will be: 200 mm×((−1))sin(1°)=−3.49 mm/degree of pitch; and the correction factor (i.e, the amount of height correction needed) to account for the ten degree negative pitch angle change will be 34.9 mm (CF=−3.49×−10°).

It should be appreciated that while the above example is shown in distance (i.e., mm) the correction factor could be easily translated to a voltage either in the calculations or by the height sensor.

Once the amount of height correction for the change in pitch angle is determined, the true or actual distance between the ground and the critical element (e.g., a cutterbar) can be displayed to an operator within the cab of the harvester. In such an embodiment, a monitor display may be coupled to the height controller to display the actual height determined by the height controller (i.e., the measured height from the height sensor corrected by applying the above equations).

While the foregoing embodiments and drawing figures are directed to headers attached to an agricultural harvester, the methods and features described herein may be applied to any machine attachment that may be pitched fore-and-aft during operation, and is applicable to any machine attachment with or without a pivoting element. In applications other than a header, rather than a cutterbar or other crop engaging element, critical element may be any element disposed on the machine attachment where it is desired to know the height of that critical element above the surface.

Various modifications to the embodiments and the general principles and features of the apparatus, systems and methods described herein will be readily apparent to those of skill in the art. Accordingly, the scope of the present disclosure is intended to be interpreted broadly and to include all variations and modifications coming within the scope of the appended claims and their equivalents.

The invention claimed is:

1. A method of accounting for change in pitch angles of an attachment supported on a machine controlled by a height control system, the height control system including a height sensor mounted to the attachment, the height sensor generating signals varying in magnitude relative to a height of the attachment relative to a surface, the method comprising the steps of:
   (a) positioning the attachment at a first elevation relative to the surface;
   (b) recording a magnitude of the generated signal of the height sensor with the attachment at the first elevation;
   (c) detecting a first pitch angle of the attachment at the first elevation;
   (d) positioning the attachment at a second pitch angle different from the first pitch angle, wherein the attachment positioned at the second pitch angle is at an elevation that is:
      (i) substantially the same as the first elevation; or
      (ii) different from the first elevation;
   (e) recording a magnitude of the generated signal of the height sensor with the attachment at the second pitch angle;
   (f) determining a pitch angle change of the attachment between the second pitch angle relative to the first pitch angle;
   (e) determining a correction factor, wherein the correction factor is a product of the pitch angle change and a scale factor;
   (h) applying the correction factor to the recorded magnitude of the generated signal of the height sensor when the attachment is at the second pitch angle to account for the pitch angle change.

2. The method of claim 1, wherein the step of determining the pitch angle change includes:
   detecting the first pitch angle relative to a reference plane;
   detecting the second pitch angle relative to the reference plane; and
   determining a difference between the first pitch angle with respect to the reference plane and the second pitch angle with respect to the reference plane.

3. The method of claim 1, wherein the step of determining the pitch angle change includes:
   detecting with a position sensor, a change in angular relationship of a supporting element of the attachment with respect to a point on the attachment.

4. The method of claim 1, wherein the step of determining the pitch angle change includes:
   detecting with a position sensor, a linear movement of a hydraulic cylinder actuated to change the attachment from the first pitch angle to the second pitch angle.

5. The method of claim 1, wherein the attachment includes a plurality of height sensors and wherein the attachment includes a non-pivoting critical element, wherein a first one of the plurality of height sensors is mounted rearward of the non-pivoting critical element and wherein a second one of the plurality of height sensors is mounted forward of the non-pivoting critical element.

6. The method of claim 1, wherein the attachment includes a plurality of height sensors and wherein the attachment includes a non-pivoting critical element, wherein a first one of the plurality of height sensors is mounted forward of the non-pivoting critical element and wherein a second one of the plurality of height sensors is mounted forward of the non-pivoting critical element.

7. The method of claim 1, wherein the attachment includes a plurality of height sensors and wherein the attachment includes a non-pivoting critical element, wherein a first one of the plurality of height sensors is mounted rearward of the non-pivoting critical element and wherein a second one of the plurality of height sensors is mounted rearward of the non-pivoting critical element.

8. The method of claim 2, wherein the attachment includes a plurality of height sensors and wherein the attachment includes a non-pivoting critical element, wherein a first one of the plurality of height sensors is mounted rearward of the non-pivoting critical element and wherein a second one of the plurality of height sensors is mounted forward of the non-pivoting critical element.

9. The method of claim 2, wherein the attachment includes a plurality of height sensors and wherein the attachment includes a non-pivoting critical element, wherein a first one of the plurality of height sensors is mounted forward of the non-pivoting critical element and wherein a second one of the plurality of height sensors is mounted forward of the non-pivoting critical element.

10. The method of claim 2, wherein the attachment includes a plurality of height sensors and wherein the attachment includes a non-pivoting critical element, wherein a first one of the plurality of height sensors is mounted rearward of the non-pivoting critical element and wherein a second one of the plurality of height sensors is mounted rearward of the non-pivoting critical element.

11. The method of claim 3, wherein the attachment includes a plurality of height sensors and wherein the attachment includes a non-pivoting critical element, wherein a first one of the plurality of height sensors is mounted rearward of the non-pivoting critical element and wherein a second one of the plurality of height sensors is mounted forward of the non-pivoting critical element.

12. The method of claim 3, wherein the attachment includes a plurality of height sensors and wherein the attachment includes a non-pivoting critical element, wherein a first one of the plurality of height sensors is mounted forward of the non-pivoting critical element and wherein a second one of the plurality of height sensors is mounted forward of the non-pivoting critical element.

13. The method of claim 3, wherein the attachment includes a plurality of height sensors and wherein the attachment includes a non-pivoting critical element, wherein a first one of the plurality of height sensors is mounted rearward of the non-pivoting critical element and wherein a second one of the plurality of height sensors is mounted rearward of the non-pivoting critical element.

14. The method of claim 4, wherein the attachment includes a plurality of height sensors and wherein the attachment includes a non-pivoting critical element, wherein a first one of the plurality of height sensors is mounted rearward of the non-pivoting critical element and wherein a second one of the plurality of height sensors is mounted forward of the non-pivoting critical element.

15. The method of claim 4, wherein the attachment includes a plurality of height sensors and wherein the attachment includes a non-pivoting critical element, wherein a first one of the plurality of height sensors is mounted forward of the non-pivoting critical element and wherein a second one of the plurality of height sensors is mounted forward of the non-pivoting critical element.

16. The method of claim 4, wherein the attachment includes a plurality of height sensors and wherein the attachment includes a non-pivoting critical element, wherein a first one of the plurality of height sensors is mounted rearward of the non-pivoting critical element and wherein a second one of the plurality of height sensors is mounted rearward of the non-pivoting critical element.

17. The method of claim 5, wherein the machine is a harvester, wherein the attachment is a head mounted to the harvester and wherein the non-pivoting critical element is a cutter bar of the head.

18. The method of claim 6, wherein the machine is a harvester, wherein the attachment is a head mounted to the harvester and wherein the non-pivoting critical element is a cutter bar of the head.

19. The method of claim 7, wherein the machine is a harvester, wherein the attachment is a head mounted to the harvester and wherein the non-pivoting critical element is a cutter bar of the head.

20. The method of claim 5, wherein the scale factor relates to a distance of each of said plurality of height sensors relative to the non-pivoting critical element.

21. The method of claim 6, wherein the scale factor relates to a distance of each of said plurality of height sensors relative to the non-pivoting critical element.

22. The method of claim 7, wherein the scale factor relates to a distance of each of said plurality of height sensors relative to the non-pivoting critical element.

23. The method of claim 1, wherein the attachment includes a plurality of height sensors, and wherein the attachment includes a first pivoting critical element on which a first one of the plurality of height sensors is mounted and a second pivoting critical element on which a second one of the plurality of height sensors is mounted.

24. The method of claim 2, wherein the attachment includes a plurality of height sensors, and wherein the attachment includes a first pivoting critical element on which a first one of the plurality of height sensors is mounted and a second pivoting critical element on which a second one of the plurality of height sensors is mounted.

25. The method of claim 3, wherein the attachment includes a plurality of height sensors, and wherein the attachment includes a first pivoting critical element on which a first one of the plurality of height sensors is mounted and a second pivoting critical element on which a second one of the plurality of height sensors is mounted.

26. The method of claim 4, wherein the attachment includes a plurality of height sensors, and wherein the attachment includes a first pivoting critical element on which a first one of the plurality of height sensors is mounted and a second pivoting critical element on which a second one of the plurality of height sensors is mounted.

27. The method of claim 23, wherein the machine is a harvester, wherein the attachment is a head mounted to the harvester and wherein the pivoting critical element is a snout of the head.

28. The method of claim 24, wherein the machine is a harvester, wherein the attachment is a head mounted to the harvester and wherein the pivoting critical element is a snout of the head.

29. The method of claim 25, wherein the machine is a harvester, wherein the attachment is a head mounted to the harvester and wherein the pivoting critical element is a snout of the head.

30. The method of claim 26, wherein the machine is a harvester, wherein the attachment is a head mounted to the harvester and wherein the pivoting critical element is a snout of the head.

31. The method of claim 23, wherein the scale factor is between a range of 0.030 and 0.040 volts per degree of the pitch angle change.

32. The method of claim 24, wherein the scale factor is between a range of 0.030 and 0.040 volts per degree of the pitch angle change.

33. The method of claim 25, wherein the scale factor is between a range of 0.030 and 0.040 volts per degree of the pitch angle change.

34. The method of claim 26, wherein the scale factor is between a range of 0.030 and 0.040 volts per degree of the pitch angle change.

35. The method of claim 23, wherein the scale factor is determined by sampling the magnitude of the generated signal of the height sensor at a predetermined elevation.

36. The method of claim 24, wherein the scale factor is determined by sampling the magnitude of the generated signal of the height sensor at a predetermined elevation.

37. The method of claim 25, wherein the scale factor is determined by sampling the magnitude of the generated signal of the height sensor at a predetermined elevation.

38. The method of claim 26, wherein the scale factor is determined by sampling the magnitude of the generated signal of the height sensor at a predetermined elevation.

* * * * *

UNITED STATES PATENT AND TRADEMARK OFFICE
CERTIFICATE OF CORRECTION

PATENT NO. : 11,696,530 B2
APPLICATION NO. : 16/486071
DATED : July 11, 2023
INVENTOR(S) : Robert Schlipf Page 1 of 1

It is certified that error appears in the above-identified patent and that said Letters Patent is hereby corrected as shown below:

In the Claims

In Claim 1, Column 18, Line 39, change "(e)" to -- (g) --.

Signed and Sealed this
Sixteenth Day of July, 2024

Katherine Kelly Vidal
*Director of the United States Patent and Trademark Office*